(12) United States Patent
Sugimoto

(10) Patent No.: US 9,716,561 B2
(45) Date of Patent: Jul. 25, 2017

(54) COMMUNICATION SYSTEM, AND COMMUNICATION DEVICE

(71) Applicant: MegaChips Corporation, Osaka-shi (JP)

(72) Inventor: Koji Sugimoto, Soraku-gun (JP)

(73) Assignee: MegaChips Corporation, Osaka-shi (JP)

( * ) Notice: Subject to any disclaimer, the term of this patent is extended or adjusted under 35 U.S.C. 154(b) by 161 days.

(21) Appl. No.: 14/360,349

(22) PCT Filed: Oct. 30, 2012

(86) PCT No.: PCT/JP2012/078004
§ 371 (c)(1),
(2) Date: May 23, 2014

(87) PCT Pub. No.: WO2013/077148
PCT Pub. Date: May 30, 2013

(65) Prior Publication Data
US 2014/0314073 A1 Oct. 23, 2014

(30) Foreign Application Priority Data
Nov. 24, 2011 (JP) .................................. 2011-256052

(51) Int. Cl.
*H04J 3/06* (2006.01)
*H04W 28/18* (2009.01)
*H04W 56/00* (2009.01)

(52) U.S. Cl.
CPC ........... *H04J 3/0605* (2013.01); *H04W 28/18* (2013.01); *H04W 56/002* (2013.01)

(58) Field of Classification Search
None
See application file for complete search history.

(56) References Cited

U.S. PATENT DOCUMENTS

2003/0148767 A1   8/2003   Sugaya et al.
2005/0085259 A1*  4/2005   Conner ................. H04B 3/542
                                                 455/552.1

(Continued)

FOREIGN PATENT DOCUMENTS

JP   2006-109433        4/2006
JP   2006-311172 A     11/2006

(Continued)

OTHER PUBLICATIONS

International Search Report issued Dec. 11, 2012, in PCT/JP2012/078004, filed Oct. 30, 2012.

(Continued)

*Primary Examiner* — Gregory Sefcheck
*Assistant Examiner* — Jenkey Van
(74) *Attorney, Agent, or Firm* — Oblon, McClelland, Maier & Neustadt, L.L.P.

(57) ABSTRACT

A communication device has a transmission/reception unit and a communication processing unit. The transmission/reception unit is configured to conform to a plurality of communication methods. The communication processing unit selects one of the plurality of communication methods with respect to each time slot based on device time in accordance with a predetermined selection rule, to perform communication via the transmission/reception unit by the selected communication method. In time synchronization master processing, a first communication device gives device time of the device itself as a time stamp to a time synchronization request signal and transmits the time synchronization request signal. In time synchronization slave processing, a second communication device receives the time synchronization request signal and calibrates the device time of the device itself based on the time stamp in the time synchronization request signal.

7 Claims, 17 Drawing Sheets

(56) References Cited

U.S. PATENT DOCUMENTS

| | | | |
|---|---|---|---|
| 2006/0072694 A1 | 4/2006 | Dai et al. | |
| 2006/0245440 A1 | 11/2006 | Mizukoshi | |
| 2007/0064732 A1* | 3/2007 | Liaw ................. | H04J 3/1694 370/468 |
| 2007/0153815 A1* | 7/2007 | She ................. | H04L 12/4035 370/401 |
| 2009/0213008 A1* | 8/2009 | Paek ................. | G01S 5/0221 342/387 |
| 2009/0310572 A1* | 12/2009 | Wang ................. | H04J 3/0697 370/336 |

FOREIGN PATENT DOCUMENTS

| | | |
|---|---|---|
| JP | 2010-28572 | 2/2010 |
| WO | 02/091683 A1 | 11/2002 |

OTHER PUBLICATIONS

International Preliminary Report on Patentability and Written Opinion issued Jun. 5, 2014, in International Application No. PCT/JP2012/078004 (with English translation).
U.S. Appl. No. 14/360,362, filed May 23, 2014, Sugimoto.
Office Action issued Aug. 4, 2015 in Japanese Patent Application No. 2011-256052 (with partial English language translation).

\* cited by examiner

F I G . 2 6
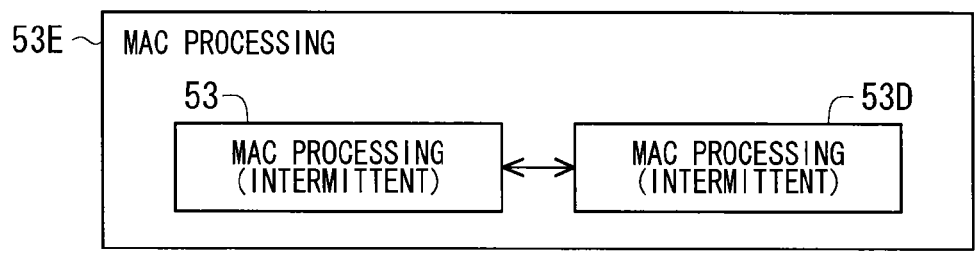

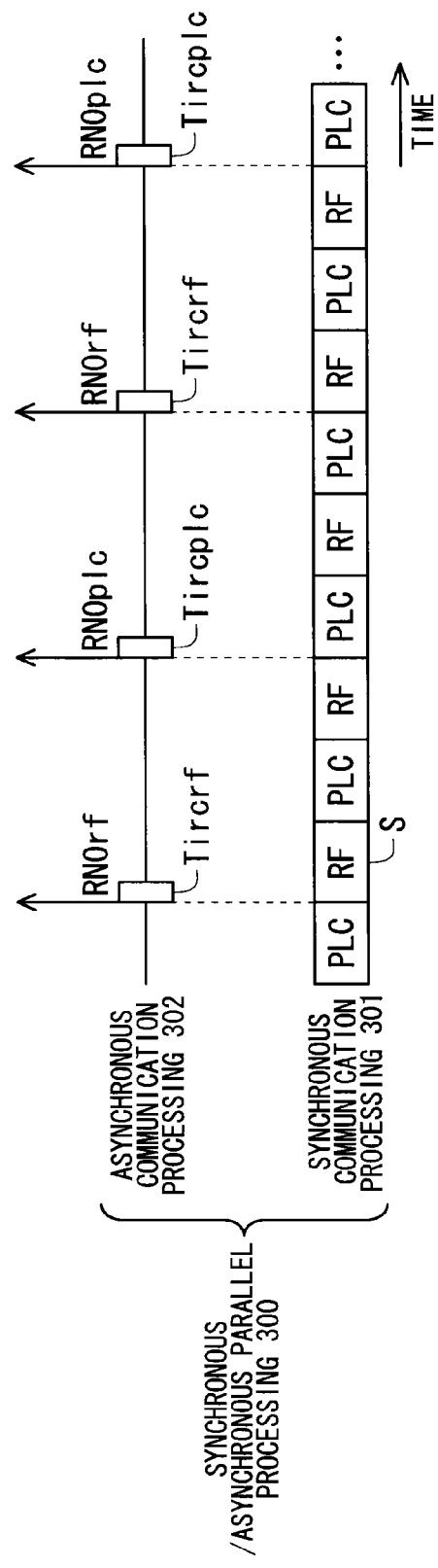

COMMUNICATION SYSTEM, AND COMMUNICATION DEVICE

TECHNICAL FIELD

The present invention relates to a communication technique.

BACKGROUND ART

Patent Document 1 listed below describes a communication system in which both wired communication and wireless communication are adopted. Specifically, the communication device constituting the system has both a wired communication function and a wireless communication function. In particular, the communication device transmits communication packets provided with the same sequence number both wired and wirelessly.

PRIOR ART DOCUMENT

Patent Document

Patent Document 1: Japanese Patent Application Laid-Open No. 2010-28572

SUMMARY OF INVENTION

Problems to be Solved by the Invention

In order to install a plurality of communication methods in the communication device, a circuit of each of communication method may be individually provided. Such a configuration is referred to as an individual type.

Further, the same circuit may be used even if the communication methods are different, and hence such a same circuit can be commonly used. Such a configuration is referred to as a common type. According to the common type, cost can be reduced by commonly using a circuit.

Here, the common circuit cannot be simultaneously used by a plurality of communication methods. For this reason, there can be considered a technique of using the common circuit in a time-division manner, namely, a technique of selecting a communication method, by which the use of the common circuit is permitted, in a time-division manner. Note that this case can be expressed such that a plurality of communication methods are temporally multiplexed (or time-division multiplexed).

An object of the present invention is to provide a variety of techniques useful for time-division multiplexing of communication methods.

Note that the time-division multiplexing of the communication method is adoptable not only to the common type but also to the individual type. For this reason, the present invention is not restricted to one of the common type and the individual type.

Means for Solving the Problems

According to a first aspect of the present invention, there is provided a communication system including a plurality of communication devices, wherein each of the plurality of communication devices has: a transmission/reception unit configured to conform to a plurality of communication methods; and a communication processing unit for selecting one of the plurality of communication methods with respect to each time slot based on device time in accordance with a predetermined selection rule, to perform communication via the transmission/reception unit by the selected communication method, the plurality of communication devices include: at least one first communication device for performing time synchronization master processing of including the device time of the device itself as a time stamp in a time synchronization request signal and transmitting the time synchronization request signal; and at least one second communication device for performing time synchronization slave processing of receiving the time synchronization request signal and calibrating the device time of the device itself based on the time stamp in the time synchronization request signal.

According to a second aspect of the present invention, there is provided the communication system according to the first aspect, wherein the time synchronization request signal has a synchronization control part, and a signal main part subsequent to the synchronization control part, the time synchronization master processing includes adopting the device time at transmission start timing for the signal main part to the time stamp, and the time synchronization slave processing includes calibrating the device time at reception start timing for the signal main part with the received time stamp.

According to a third aspect of the present invention, there is provided the communication system according to the first or second aspect, wherein the at least one first communication device is a plurality of first communication devices, the time synchronization master processing includes processing of setting an authority level to the time synchronization request signal, and the time synchronization slave processing is executed on a condition that the authority level of the received time synchronization request signal is the same a maximum value of the authority levels of the time synchronization request signals having received so far or higher than the maximum value.

According to a fourth aspect of the present invention, there is provided the communication system according to any one of the first to third aspects, wherein the predetermined selection rule is a rule involving the device time at the time of selecting the communication method.

According to a fifth aspect of the present invention, there is provided the communication system according to any one of the first to fourth aspects, wherein the at least one first communication device includes at least one communication device capable of executing the time synchronization slave processing in addition to the time synchronization master processing.

According to a sixth aspect of the present invention, there is provided the communication system according to any one of the first to fifth aspects, wherein the at least one second communication device includes at least one communication device capable of executing the time synchronization master processing in addition to the time synchronization slave processing.

According to a seventh aspect of the present invention, there is provided a communication device including: a transmission/reception unit configured to conform to a plurality of communication methods; and a communication processing unit for selecting one of the plurality of communication methods with respect to each time slot based on device time in accordance with a predetermined selection rule, to perform communication via the transmission/reception unit by the selected communication method, wherein the communication processing unit performs time synchronization master processing of including the device time of the device itself as a time stamp in a time synchronization request signal and transmitting the time synchronization request signal.

According to an eighth aspect of the present invention, there is provided the communication device according to the seventh aspect, wherein the communication processing unit further performs time synchronization slave processing of receiving the time synchronization request signal and calibrating the device time of the device itself based on the time stamp in the time synchronization request signal.

According to a ninth aspect of the present invention, there is provided a communication device including: a transmission/reception unit configured to conform to a plurality of communication methods; and a communication processing unit for selecting one of the plurality of communication methods with respect to each time slot based on device time in accordance with a predetermined selection rule, to perform communication via the transmission/reception unit by the selected communication method, wherein the communication processing unit performs time synchronization slave processing of receiving the time synchronization request signal and calibrating the device time of the device itself based on the time stamp in the time synchronization request signal.

Effects of the Invention

According to the first aspect, switching of the time slot in each of the communication devices can be synchronized between the plurality of communication devices. Hence it is possible to improve deterioration in communication efficiency which occurs due to deviation of the time slots between the plurality of communication devices.

According to the second aspect, the device time is acquired at the same position in the time synchronization request signal in the time synchronization master processing and the time synchronization slave processing. Hence it is possible to enhance the synchronization accuracy.

Further, in the time synchronization master processing, the transmission start timing for the signal main part (i.e., shift timing from a synchronization control part to the signal main part) exists in an early stage of transmission of the time synchronization request signal. For this reason, there is a temporal margin from this timing to the transmission end of the time synchronization request signal. Hence it is possible to perform processing of including the time stamp in the time synchronization request signal with a temporal margin.

Further, on the reception side of the time synchronization request signal, it may be difficult to accurately detect the start timing for the synchronization control part.

In view of the above, it is practical to acquire the device time at the start timing for the signal main part in both the time synchronization master processing and the time synchronization slave processing.

According to the third aspect, even in a configuration in which two or more first communication devices for performing the time synchronization master processing exist, it is possible to avoid an uncertain state of the device time which can occur by frequent execution of the time synchronization slave processing.

Further, since two or more first communication devices for performing the time synchronization master processing exist, it is possible to hold the time synchronization, even if one of the first communication devices is removed from the system, for example. In other words, it is possible to provide a system that facilitates management of the time synchronization.

According to the fourth aspect, it is possible to synchronize selection of the communication method between the plurality of communication devices. Hence it is possible to improve deterioration in communication efficiency which occurs due to the communication methods being different between the plurality of communication devices.

According to the fifth and sixth aspects, the communication device that performs both the time synchronization master processing and the time synchronization slave processing exists. Hence it is possible to bring the device time into synchronization over a wide range of the communication system. Such a point helps expansion of installation range for the communication device, namely, area expansion for the communication system.

According to the seventh to ninth aspects, it is possible to provide the communication system according to the first aspect, and further the communication system according to the second to sixth aspects.

The objects, features, aspects and advantages of the present invention will become more apparent by the following detailed descriptions and attached drawings.

BRIEF DESCRIPTION OF DRAWINGS

FIG. 26 is a block diagram illustrating MAC processing means according to the fifth embodiment.

FIG. 27 is a sequence diagram illustrating a communication operation according to the fifth embodiment.

DESCRIPTION OF EMBODIMENTS

First Embodiment

<Communication System 1>

Figure 1:
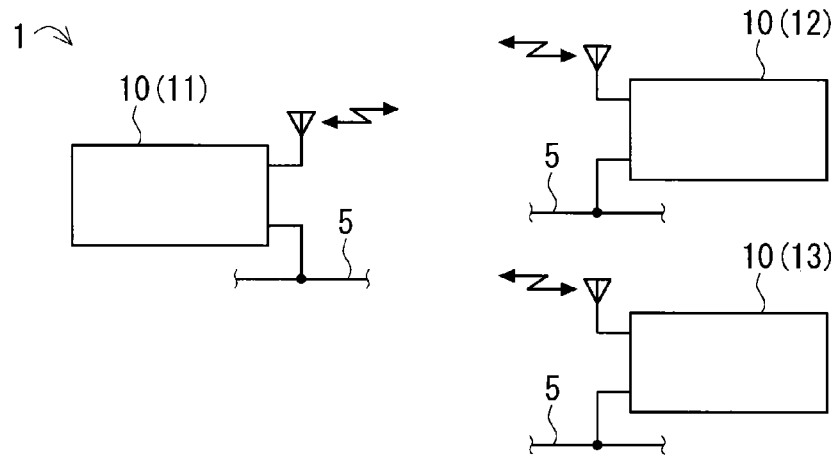
FIG. 1 is a configuration diagram illustrating a communication system according to a first embodiment.

FIG. 1 illustrates a schematic configuration of a communication system 1 according to a first embodiment. In the example of FIG. 1, the communication system 1 includes three communication devices 10. However, the number of communication devices 10 is not restricted to this example. In the following description, the three communication devices 10 may be referred to as communication devices 11, 12, 13 so as to be distinguished.

Each communication device 10 has both a wireless communication function and a wired communication function. Herein, power line communication (PLC) using a power line 5 as a transmission path is illustrated as the wired communication, this example is not restrictive. Note that, hereinafter, wireless communication and wireless may be represented as RF.

<Communication Device 10>

Figure 2:
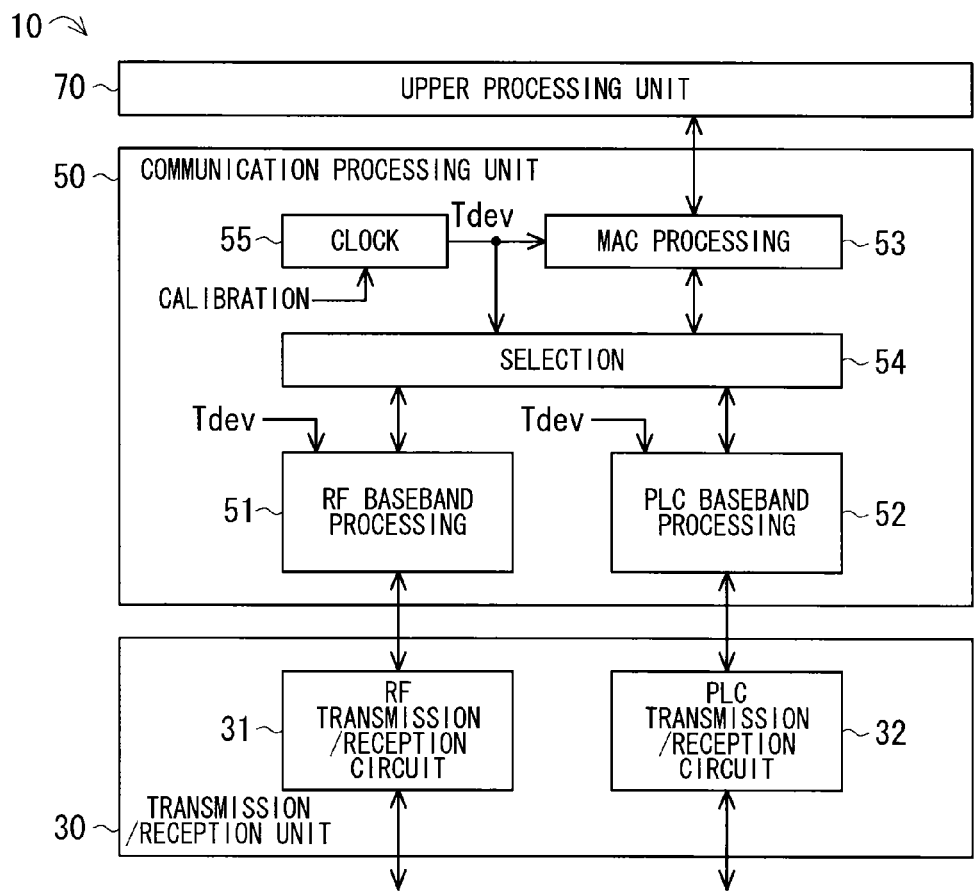
FIG. 2 is a block diagram illustrating a communication device according to the first embodiment.

FIG. 2 illustrates a block diagram of the communication device 10. According to the example of FIG. 2, the communication device 10 includes a transmission/reception unit 30, a communication processing unit 50, and an upper processing unit 70. Note that a variety of names may be abbreviated in the drawings and the following descriptions.

The transmission/reception unit 30 is configured to conform to the RF method and the PLC method, and includes an RF transmission/reception circuit 31 and a PLC transmission/reception circuit 32.

The RF transmission/reception circuit 31 performs transmission/reception of a wireless signal. For example, the RF transmission/reception circuit 31 converts a baseband signal (i.e., data included in the signal), inputted from the communication processing unit 50, to a wireless signal and transmits the wireless signal from an antenna. Further, the RF transmission/reception circuit 31 converts the wireless signal received via the antenna to a baseband signal that can be inputted into the communication processing unit 50 (i.e., in accordance with an input signal format of the communication processing unit 50) via the antenna. The obtained baseband signal is inputted into the communication processing unit 50.

The PLC transmission/reception circuit 32 performs transmission/reception of a PLC signal. For example, the PLC transmission/reception circuit 32 superimposes a baseband signal, inputted from the communication processing unit 50, on a voltage of the power line 5 as the PLC signal. Further, the PLC transmission/reception circuit 32 extracts the PLC signal superimposed on the voltage of the power line 5, and converts the PLC signal to a baseband signal that can be inputted into the communication processing unit 50. The obtained baseband signal is inputted into the communication processing unit 50.

The communication processing unit 50 performs processing of mediating communication data between the upper processing unit 70 and the transmission/reception unit 30, while performing a variety of processing related to the communication.

Here, a case is illustrated where the communication processing unit 50 provides a function of a physical (PHY) layer and a function of a media access control (MAC) layer (or data link layer) in an OSI (Open System Interconnection) reference model, and the upper processing unit 70 provides a function of an upper layer than those. Note that each layer of the OSI reference model can be associated with each layer of another communication protocol stack.

In the example of FIG. 2, the communication processing unit 50 includes: baseband processing means (hereinafter, also referred to as RF baseband processing means) 51 for the RF transmission/reception circuit 31; baseband processing means (hereinafter, also referred to as PLC baseband processing means) 52 for the PLC transmission/reception circuit 32, media access control processing means (hereinafter, also referred to as MAC processing means) 53; selection means 54; and a clock 55.

The MAC processing means 53 provides a function of a MAC layer, and performs so-called MAC processing. The MAC processing includes transmission processing and reception processing. In the transmission processing, for example, a MAC header, or additionally other information, is added to a PDU (Protocol Data Unit, hereinafter, also referred to as packet) inputted from the upper processing unit 70, to generate a PDU (hereinafter, also referred to as a frame or a MAC frame) of the MAC layer. The generated MAC frame is delivered to one of the baseband processing means 51 and 52.

The reception processing includes processing of interpreting the MAC frame restored by the baseband processing means 51, 52 and processing in accordance with the interpretation. For example, it is discriminated whether or not the received MAC frame is addressed to the device itself. Then, as for the MAC frame addressed to the device itself, a packet to be delivered to the upper processing unit 70 is generated by removing the MAC header or the like. Further, for example, when the received MAC frame includes a request for a response (ACK), an ACK frame is generated and transmitted. Moreover, while a MAC frame addressed to the other device may be discarded, a signal can be relayed if the MAC frame is transmitted.

The MAC processing may include processing (hereinafter, referred to as MAC related processing) other than processing (hereinafter, referred to as MAC frame processing) for the MAC frame itself such as the above-mentioned transmission processing and reception processing. Examples of the MAC related processing include control processing in accordance with control information included in the received MAC frame (e.g., control regarding setting in the MAC processing means 53 or the communication processing unit 50).

The selection means 54 functionally connects one of the RF baseband processing means 51 and the PLC baseband processing means 52 with the MAC processing means 53 in a selective (i.e., exclusive) manner. That is, one of the baseband processing means 51 and 52 is validated with respect to the MAC processing means 53. Accordingly, the MAC processing means 53 receives and delivers the MAC frame to and from the selected (i.e., validated) baseband processing means 51 or 52.

The selection of the baseband processing means 51, 52 is performed in accordance with a previously given selection rule.

By such selection control by the selection means 54, the communication processing unit 50 selects the RF method and the PLC method in a time-division manner, and performs communication by the selected communication method via the transmission/reception unit 30.

Here, in the example of FIG. 2, a transmission frame is delivered from the MAC processing means 53 to the validated baseband processing means 51 or 52 via the selection means 54. That is, the selection means 54 delivers the transmission frame to the validated baseband processing means 51 or 52.

As opposed to this, it is also possible to adopt a configuration in which the selection means 54 instructs the MAC processing means 53 to deliver the transmission frame to either the baseband processing means 51 or 52. According to such an example, the transmission frame is delivered from the MAC processing means 53 to the baseband processing means 51 or 52 without passing the selection means 54.

Further, in the example of FIG. 2, a reception frame is delivered from the baseband processing means 51 or 52 to the MAC processing means 53 via the selection means 54.

As opposed to this, it is also possible to adopt a configuration in which the reception frame is delivered from the baseband processing means 51 or 52 to the MAC processing means 53 without passing the selection means 54.

The RF baseband processing means 51 is provided with respect to the RF transmission/reception circuit 31, and the PLC baseband processing means 52 is provided with respect to the PLC transmission/reception circuit 32. Both the baseband processing means 51, 52 each provide a function of a physical layer, and perform so-called baseband processing. The baseband processing includes processing (hereinafter, also referred to as baseband signal processing) regarding a baseband signal itself and processing (hereinafter, also referred to as baseband related processing) that uses a baseband signal.

The baseband signal processing includes transmission processing and reception processing. When the RF baseband processing means 51 is taken as an example, the transmission processing includes, for example, processing of generating a PHY frame from a MAC frame delivered from the MAC processing means 53 by performing addition of a PHY header, data modulation for wireless communication, addition of synchronization control information (herein, a preamble and an SFD are illustrated), and the like. The PHY frame is inputted into the RF transmission/reception circuit 31 as a baseband signal that can be inputted into the RF transmission/reception circuit 31 (i.e., in accordance with an input signal format of the RF transmission/reception circuit 31).

The reception processing includes, for example, processing of generating a MAC frame from a baseband signal inputted from the RF transmission/reception circuit 31 by performing detection of synchronization control information, data demodulation for wireless communication, deletion of the PHY header, and the like.

Further, examples of the baseband related processing include a variety of processing (e.g., so-called carrier sense or the like) using the transmission/reception circuits 31, 32.

Although the baseband processing by the PLC baseband processing means 52 is basically the same as the baseband processing by the RF baseband processing means 51, it is modified as appropriate in accordance with the difference between the PLC method and the RF method.

The processing means 51 to 54 can be realized, for example, by means of software. Specifically, by a processor (not shown) executing a program (stored in storage means, not shown) in which processing procedures for realizing a variety of functions of the processing means 51 to 54 are described, the processor functions as the processing means 51 to 54. Note that the above processor may be a general-purpose CPU (Central Processing Unit) or a specialized DSP (Digital Signal Processor). Further, the processing means 51 to 54 may be realized by a plurality of processors. It is also possible to realize part or all of the variety of functions of the processing means 51 to 54 by means of hardware.

The clock 55 counts a value in a predetermined cycle (i.e., predetermined frequency), and provides the counted value as time (hereinafter, referred to as device time) Tdev used in the device. As the minimum time unit of the predetermined period, namely, the device time Tdev, for example, an oscillation cycle of a crystal oscillator can be adopted, but another time length may be adopted. In the example of FIG. 2, the device time Tdev is supplied to each of the processing means 51 to 54.

Note that the device time Tdev may be expressed by the counted value itself or may be expressed by converting the counted value to information by units of general hours, minutes and seconds, for example.

The clock 55 can be configured by a so-called clock circuit, a real time clock (RTC) or the like, for example. Further, for example, the clock 55 may be realized by a counter for counting an operation clock signal of the above processor which is caused to function as the processing means 51 to 54. Note that the clock 55 may be externally attached to a package of the processor for the processing means 51 to 54 or may be installed into the package.

As described above, the upper processing unit 70 provides the function of the upper layer than the MAC layer (or the data link layer) in the OSI reference model. The upper processing unit 70, for example, performs generation of a transmission packet, interpretation of a reception packet, processing in accordance with the interpretation, and the like. Here, the upper processing unit 70 is to be realized in a manner of software by a processor (the general-purpose CPU is illustrated, which is not shown) that manages the whole processing in the communication device 10.

Here, the transmission/reception circuits 31, 32 may be a configuration independent of each other (i.e., individual type) or may be a configuration in which part of the circuit is commonly used (i.e., common type). Further, in the RF transmission/reception circuit 31, the transmission circuit and the reception circuit may be either the individual type or the common type. The same applies to the PLC transmission/reception circuit 32. Here, in either common type, a case is illustrated where the communication processing unit 50 performs validation processing for the common circuit (selection of a circuit to be a user of the common circuit, switch control for circuit connection, or the like). More specifically, the selection means 54 is to control the transmission/reception unit 30 directly or indirectly (i.e., via the baseband processing means 51, 52).

Further, the baseband processing means 51, 52 may be configured to be independent of each other or may be configured to commonly use part of the processing means (i.e., function). Moreover, in the RF baseband processing means 51, transmission processing means and reception processing means may be either the individual type or the common type. The same applies to the PLC baseband processing means 52. Here, in either common type, a case is illustrated where the selection means 54 performs validation processing for common means (selection of processing means to be a user of the common means, switch control for a processing flow, or the like).

<Communication Operation>

Figure 3:
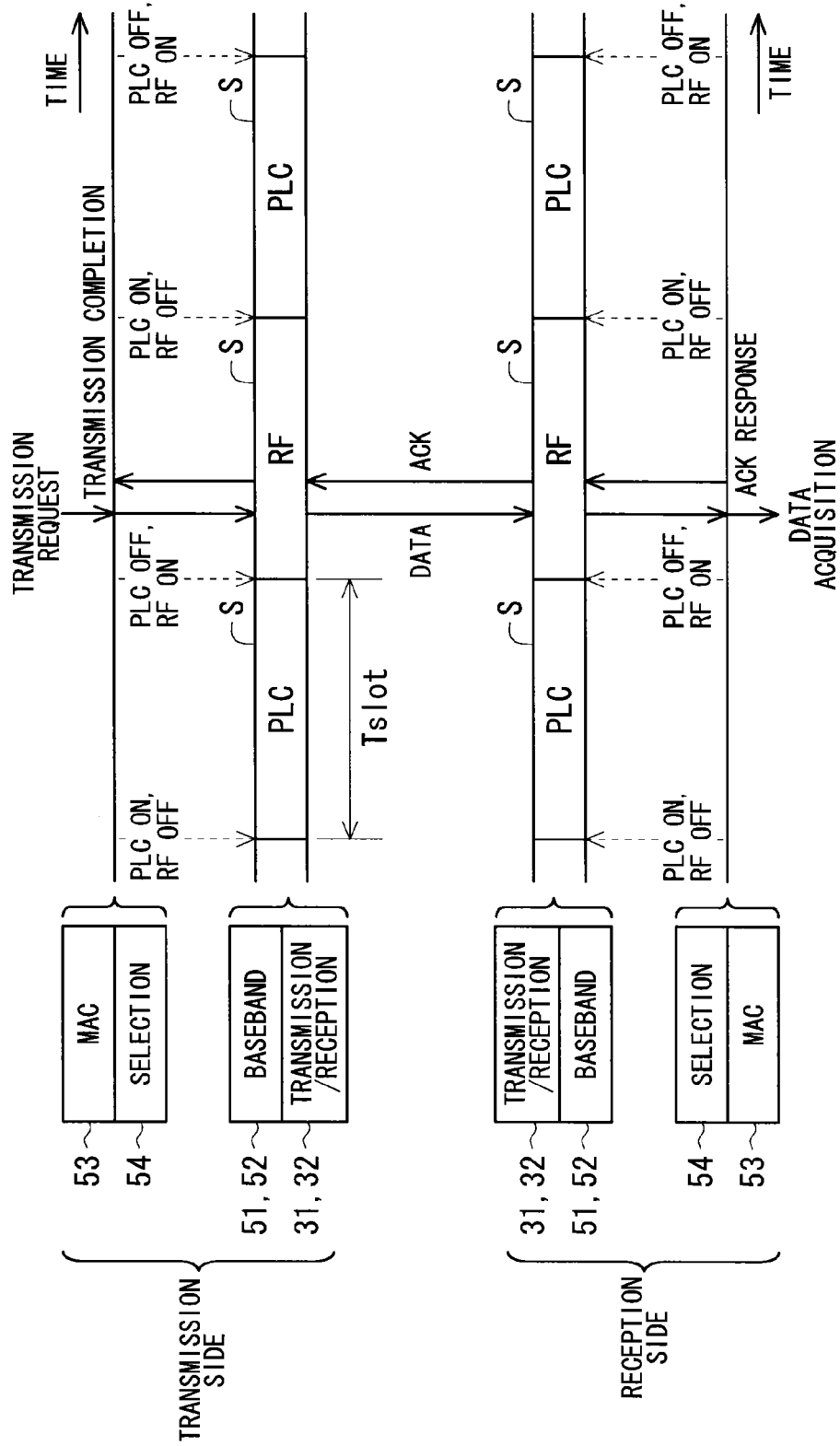
FIG. 3 is a sequence diagram for describing a first example of a communication operation according to the first embodiment.
Figure 4:
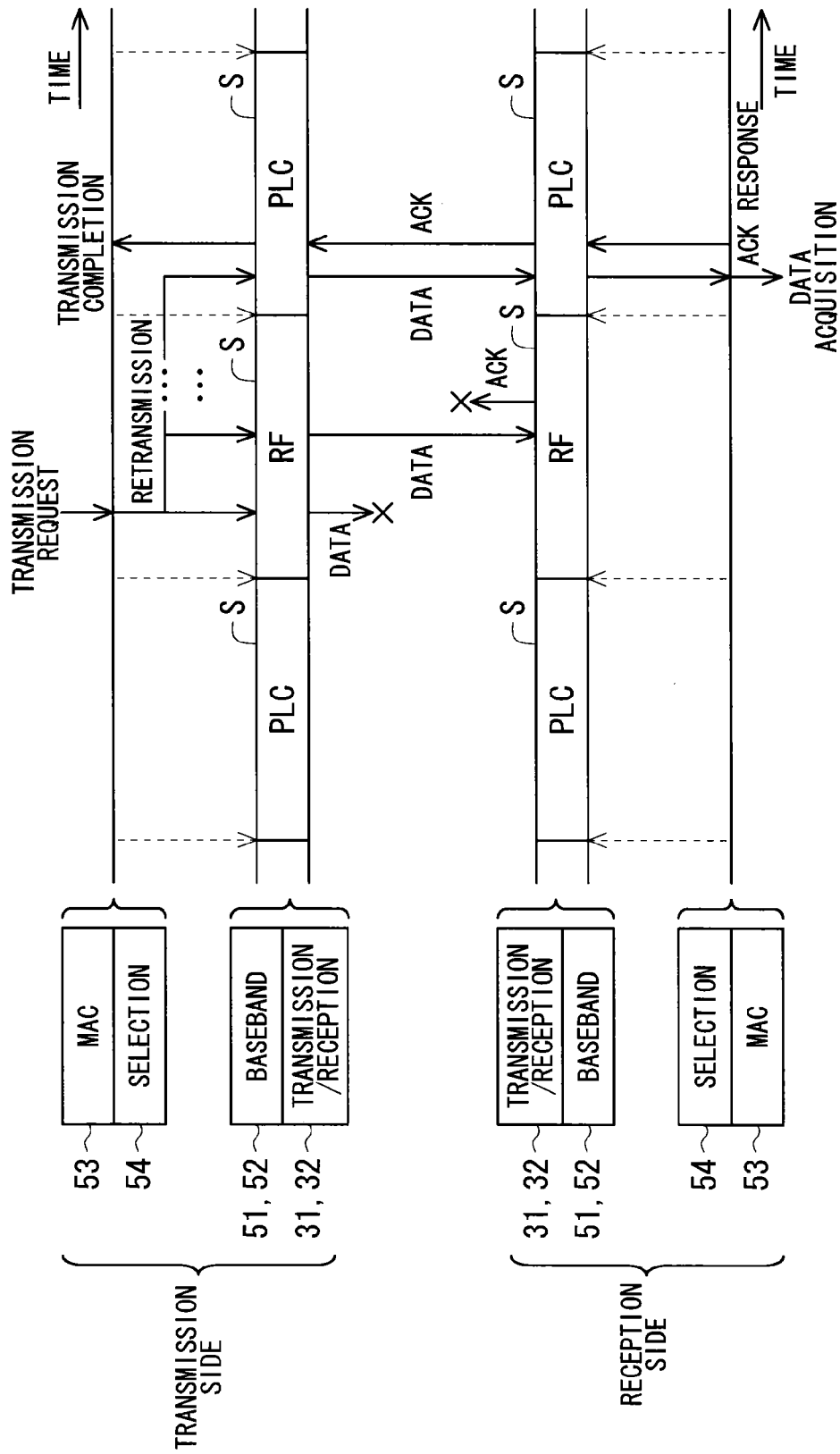
FIG. 4 is a sequence diagram for describing a second example of a communication operation according to the first embodiment.
Figure 5:
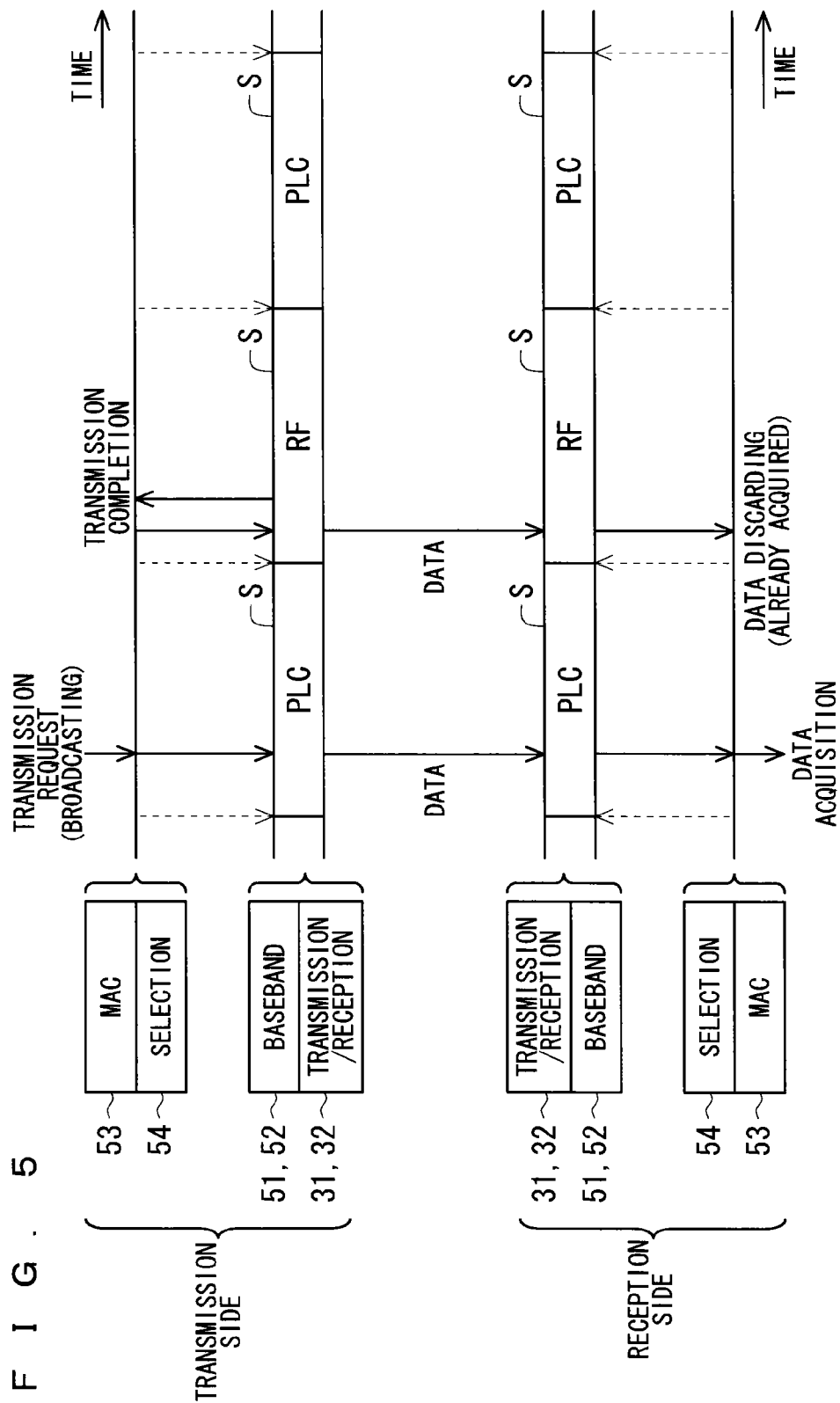
FIG. 5 is a sequence diagram for describing a third example of a communication operation according to the first embodiment.

FIGS. 3 to 5 illustrate communication operations by the communication device 10. For the sake of simplifying the description, in FIGS. 3 to 5, the MAC processing means 53 and the selection means 54 are illustrated together, and the baseband processing means 51, 52 and the transmission/reception circuits 31, 32 are illustrated together.

In any of the operation examples, the communication device 10 performs synchronous communication using a time slot S.

With reference to the example of FIG. 3, the selection means 54 divides the device time Tdev (cf. FIG. 2) into each predetermined time Tslot to specify the time slot S, while allocating either the RF method or the PLC method to each time slot S. That is, during a period of the time slot S (hereinafter, may also be referred to as an RF time slot S) allocated with the RF method, the RF baseband processing means 51 and the RF transmission/reception circuit 31 are validated, and the PLC baseband processing means 52 and the PLC transmission/reception circuit 32 are not used. During a period of the time slot S (hereinafter, may also be referred to as a PLC time slot S) allocated with the PLC method, the state is opposite to the above state.

Further, in the example of FIG. 3, the RF method and the PLC method are alternately allocated. That is, the selection means 54 selects the communication method in accordance with the selection rule in which the RF method and the PLC method are selected alternately (i.e., in predetermined order).

According to a first example shown in FIG. 3, in the communication device 10 on the transmission side, the MAC processing means 53 receives a packet including transmitted data DATA from the upper processing unit 70 (cf. FIG. 2), processes the packet into a MAC frame, and delivers the MAC frame to the selection means 54. In the example of FIG. 3, the selection means 54 inputs the MAC frame into the RF baseband processing means 51 which is valid at the time of reception of the MAC frame.

When the selection means 54 determines that transmission of the MAC frame cannot be completed during the RF time slot S at the time of reception of the MAC frame, the output of the MAC frame may be suspended until the start of the next PLC time slot S.

The RF baseband processing means 51 having received the MAC frame processes the MAC frame into a baseband signal, and delivers the baseband signal to the RF transmission/reception circuit 31. Accordingly, a corresponding RF signal is outputted from the RF transmission/reception circuit 31.

According to the example of FIG. 3, in the communication device 10 on the reception side, the RF transmission/reception circuit 31 receives the above RF signal in the RF time slot S. The received signal is restored to the MAC frame by the RF transmission/reception circuit 31 and the RF baseband processing means 51. The restored MAC frame is delivered to the MAC processing means 53 via the selection means 54. The MAC processing means 53 processes the MAC frame into a packet and delivers the packet to the upper processing unit 70.

Further, in the example of FIG. 3, the MAC processing means 53 interprets that the received MAC frame includes an ACK request, and thereby generates an ACK frame. The ACK frame is delivered to the selection means 54, and transmitted by the processing same as that on the above transmission side. A series of processing is completed by reception of the ACK frame by the MAC processing means 53 on the ACK requested side.

Note that, communication not requesting an ACK can also be adopted. For example, in broadcasting and multicasting, it may be preferable not to request an ACK due to the possibility of collision of ACKs. Naturally, an ACK can be omitted also in unicasting.

While the RF communication has been illustrated in the example of FIG. 3, PLC communication is performed in the PLC time slot S, by the PLC baseband processing means 52 and the PLC transmission/reception circuit 32.

Subsequently, in a second example shown in FIG. 4, the communication device 10 on the transmission side repeats transmission processing by non-reception of an ACK. The non-reception of the ACK may occur due to the fact that the ACK has not arrived at the reception side, a transmitted signal itself has not arrived at the reception side, or the like. Note that the non-arrival of the signal is considered as being caused, for example, by deterioration in communication status, disagreement of the communication methods, or the like.

For example, when the MAC processing means 53 determines that the ACK has not been received even after the lapse of ACK waiting time (shorter than the time Tslot of the time slot S) based on the device time Tdev, the MAC processing means 53 re-outputs a target MAC frame. Alternatively, the selection means 54 may re-output the target MAC frame by instruction of the MAC processing means 53. Alternatively, by the selection means 54 discriminating whether or not the received signal is the ACK frame (this can be discriminated from information showing the kind of frame in the reception frame), the selection means 54 itself may perform retransmission processing without instruction of the MAC processing means 53.

The upper limit number of times of retransmission, an interval and the like are previously set and are, for example, stored into storage means provided accessibly by the MAC processing means 53 or the selection means 54. For example, the communication device 10 that functions as a master in regard to setting of the upper limit number of times of retransmission and the like transmits a set value regarding retransmission to another communication device 10 serving as a slave, thereby allowing each of the communication devices 10 to acquire the set value.

As illustrated in FIG. 4, the retransmission processing may be performed over a plurality of time slots S, and in this case, retransmission is performed by both RF and PLC. Conversely, the time slot S may be switched, to thereby stop the retransmission processing.

Subsequently, according to a third example shown in FIG. 5, the same transmitted data DATA is provided with the same sequence number (used for distinguishing frames), and transmitted by both RF and PLC. When reception is successful with both RF and PLC as in the case of FIG. 5, a frame having the already received sequence number (i.e., frame received later) is discarded.

According to this example, improvement in reliability of communication can be expected as compared with the case of transmitting the frame by only one of RF and PLC. For this reason, an ACK can be omitted as in the example of FIG. 5. In view of such a point, it can be considered to adopt the example of FIG. 5 to broadcasting and multicasting.

Note that discarding of the already received frame having the same sequence number is not restricted to the example of FIG. 5. For example, also in a case where the communication device 10 has a relay function, there is a possibility of receiving frames having the same sequence number twice or more. In such a case, the already received frame may be discarded.

<Synchronization of Device Time Tdev>

The communication device 10 performs synchronous communication using the time slot S as described above. In synchronous communication, when there is a deviation in period of the RF time slot S between the transmission side and the reception side, the communication possible time becomes shorter, resulting in deterioration in communication efficiency. For this reason, the period of the RF time slot S on the transmission side preferably agrees with (i.e., is synchronized with) that on the reception side. The same applies to the PLC time slot S.

In view of such a point, the communication system 1 performs device-time synchronization processing for making the device time Tdev to be used for generation of the time slot S agree (i.e., synchronized) between the communication devices 10.

Figure 6:
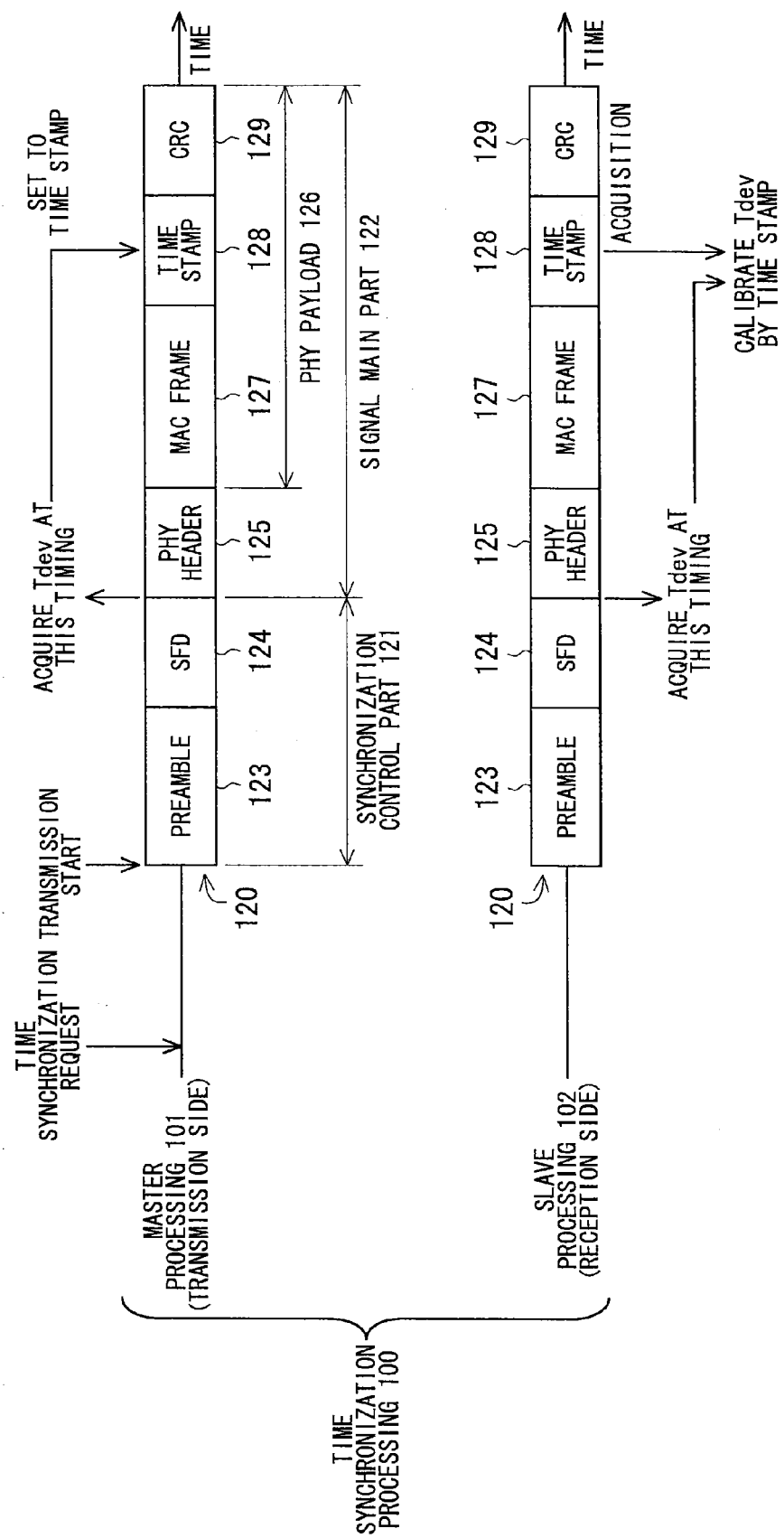
FIG. 6 is a sequence diagram illustrating device-time synchronization processing according to the first embodiment.

FIG. 6 illustrates device-time synchronization processing. As shown in FIG. 6, a device-time synchronization processing 100 is divided into time synchronization master processing 101 and time synchronization slave processing 102, and these processing 101, 102 are performed in separate communication devices 10. Here, a case is illustrated where the communication device 11 (cf. FIG. 1) performs the time synchronization master processing 101, and the communication devices 12, 13 (cf. FIG. 1) perform the time synchronization slave processing 102. In such an example, the communication device 11 may be referred to as a first communication device 11 regarding time synchronization or as a time synchronization master device 11, and the communication devices 12, 13 may be referred to as second communication devices 12, 13 regarding time synchronization or as time synchronization slave devices 12, 13.

For the sake of simplifying the description, a case will be illustrated where the device-time synchronization processing 100 is performed by the RF method. However, the PLC method is to be understood in the same manner.

<Time Synchronization Master Processing 101>

As shown in FIG. 6, the communication processing unit 50 starts the time synchronization master processing 101 by generation of a synchronization request for the device time Tdev. Here, a case is illustrated where the time synchronization request is generated by the selection means 54. However, for example, the MAC processing means 53 or the upper processing unit 70 may generate the time synchronization request. That is, the communication processing unit 50 acquires the time synchronization request by means of internal generation or external input. Note that the time synchronization request may be generated cyclically or at random time intervals.

The MAC processing means 53 generates the MAC frame for time synchronization request by the selection means 54 inputting the time synchronization request into the MAC processing means 53. This MAC frame includes information indicating that it is a time synchronization request frame (i.e., information of the kind of frame), information indicating that it is broadcasted (i.e., information indicating that destinations are all time synchronization slave devices 12, 13), and the like. For example, a set value of the time Tslot of the time slot S and the like may be included.

Subsequently, the MAC frame for time synchronization request can be transformed into the PHY frame by the RF baseband processing means 51 which is valid at that time. Then, the PHY frame is outputted as a baseband signal from the RF baseband processing means 51, and the baseband signal is converted to a wireless signal and outputted from the RF transmission/reception circuit 31. Note that the baseband signal for time synchronization request is also referred to as a time synchronization request signal.

As shown in FIG. 6, similarly to a general PHY baseband signal, a time synchronization request signal 120 (more specifically, a bit string thereof) is broadly divided into a synchronization control part 121 and a signal main part 122 subsequent to the synchronization control part 121.

The synchronization control part 121 is information to be used by the reception side for detecting the time synchronization request signal 120, synchronizing the signal 120, and the like. In the example of FIG. 6, the synchronization control part 121 is configured by a preamble 123, and a SFD (Start Frame Delimiter) 124 subsequent to the preamble 123. Generally, a bit string in a predetermined pattern is previously allocated to the preamble 123, and the same applies to the SFD 124.

The signal main part 122 is basically configured by a PHY header 125 and a PHY payload 126 subsequent to the PHY header 125. In the PHY payload 126 illustrated in FIG. 6, a MAC frame (here, a MAC frame for time synchronization request) 127, a time stamp 128, an error detection code (herein, a CRC (Cyclic Redundancy Check) is illustrated) 129 are arranged from the PHY header 125 side.

In the time synchronization request signal 120, elements 123, 124, 125, 128, 129 except for the MAC frame 127 are added by the RF baseband processing means 51.

Especially, as the time stamp 128, the device time Tdev at transmission start timing for the signal main part 122 (i.e., transmission end timing for the synchronization control part 121) is set.

Specifically, the RF baseband processing means 51 detects timing for switching from a bit string of the SFD 124 to a bit string of the PHY header 125 during the output of the time synchronization request signal 120, and acquires from the clock 55 the device time Tdev of the device itself at the detection timing. Then, the RF baseband processing means 51 adds the acquired device time Tdev as the time stamp 128 to the back of the MAC frame 127. Thereafter, the RF baseband processing means 51 calculates a CRC regarding a bit string from the head of the preamble 123 to the tail end of the time stamp 128, and the obtained CRC is added to the back of the time stamp 128.

Accordingly, in the time synchronization master processing 101, the time synchronization request signal 120, including the device time Tdev of the time synchronization master device 11 as the time stamp 128, is generated and the time synchronization request signal 120 is transmitted to the time synchronization slave devices 12, 13.

Here, the RF baseband processing means 51 specifies positions of the PHY header 125 and the like out of the received bit strings by using a bit pattern of the synchronization control part 121 in general reception processing. Therefore, the use of such a function allows detection of timing for switching from the SFD 124 to the PHY header 125 also in the time synchronization master processing 101.

<Time Synchronization Slave Processing 102>

When receiving the time synchronization request signal 120, the time synchronization slave devices 12, 13 perform the time synchronization slave processing 102. Note that the time synchronization request signal 120 may be directly received from the time synchronization master device 11 or may be received through the relay by another time synchronization slave device.

Specifically, the RF baseband processing means 51 detects reception start timing for the signal main part 122 (i.e., reception end timing for the synchronization control part 121) during reception of the time synchronization request signal 120, and acquires from the clock 55 the device time Tdev of the device itself at the detection timing. Further, the RF baseband processing means 51 extracts the MAC frame 127 and the time stamp 128 out of the time synchronization request signal 120. Then, the RF baseband processing means 51 delivers the device time Tdev acquired from the clock 55, the MAC frame 127, and the time stamp 128 to the MAC processing means 53.

When interpreting that the received MAC frame is for time synchronization request, the MAC processing means 53 calibrates the device time Tdev of the device itself in accordance with a difference between the device time Tdev acquired at the reception start timing for the signal main part 122 and the time recorded in the received time stamp 128.

Here, a case is illustrated where the MAC processing means 53 calibrates the current time itself of the clock 55 in accordance with the above difference. However, for example, the selection means 54 may hold the above difference, and the time obtained by calibrating the device time Tdev provided from the clock 55 with the difference may be treated as the device time Tdev to be used for generation of the time slot S, and the like.

Meanwhile, at the time of detecting the reception start timing for the signal main part 122, the time synchronization slave devices 12, 13 cannot discriminate whether or not the received signal is the time synchronization request signal 120. However, the time synchronization slave devices 12, 13 may only acquire the device time Tdev at the reception start timing for the signal main part 122 with respect to all received signals.

Further, it is possible to discriminate whether or not the received signal is the time synchronization request signal 120 at the time of acquiring the bit string showing the kind of frame in the MAC frame 127. That is, when the received signal is discriminated as the time synchronization request signal 120, it is discriminated as including the time stamp 128. Therefore, only when it is discriminated as the time synchronization request signal 120, extraction processing for the time stamp 128 is performed.

Although the case has been illustrated above where the MAC processing means 53 calibrates the device time Tdev, it is also possible to make the selection means 54 calibrate the device time Tdev.

<Effects by Device-Time Synchronization Processing 100>

According to the device-time synchronization processing 100, it is possible to synchronize switching of the time slot S in each communication device 10 between a plurality of communication devices 10. Hence, it is possible to improve deterioration in communication efficiency which occurs due to deviation of the time slot S between the plurality of communication devices 10.

Here, the acquisition timing for the device time Tdev can also be made different between the time synchronization master processing 101 and the time synchronization slave processing 102. For example, the acquisition timing for the device time Tdev in the time synchronization master processing 101 can be set at the transmission start timing for the preamble 123. Further, for example, the acquisition timing for the device time Tdev in the time synchronization slave processing 102 can be set at the end timing for the time synchronization request signal 120.

However, as in the above example, the device time Tdev is acquired at the same position in the time synchronization request signal 120 in the time synchronization master processing 101 and the time synchronization slave processing 102, to thereby allow enhancement of the synchronization accuracy.

Further, in the time synchronization master processing 101, the transmission start timing for the signal main part 122 (i.e., shift timing from the synchronization control part 121 to the signal main part 122) exists in an early stage of transmission of the time synchronization request signal 120. For this reason, there is a temporal margin from the timing to the transmission end of the time synchronization request signal 120. Hence, it is possible to perform processing of including the time stamp 128 in the time synchronization request signal 120 with a temporal margin.

Further, in the time synchronization slave devices 12, 13, it may be difficult to accurately detect the start timing for the preamble 123 and the SFD 124.

In view of the above, as in the above example, it is practical to acquire the device time Tdev at the start timing for the signal main part 122 in both the time synchronization master processing 101 and the time synchronization slave processing 102.

<Selection Rule of Communication Method>

Figure 7:
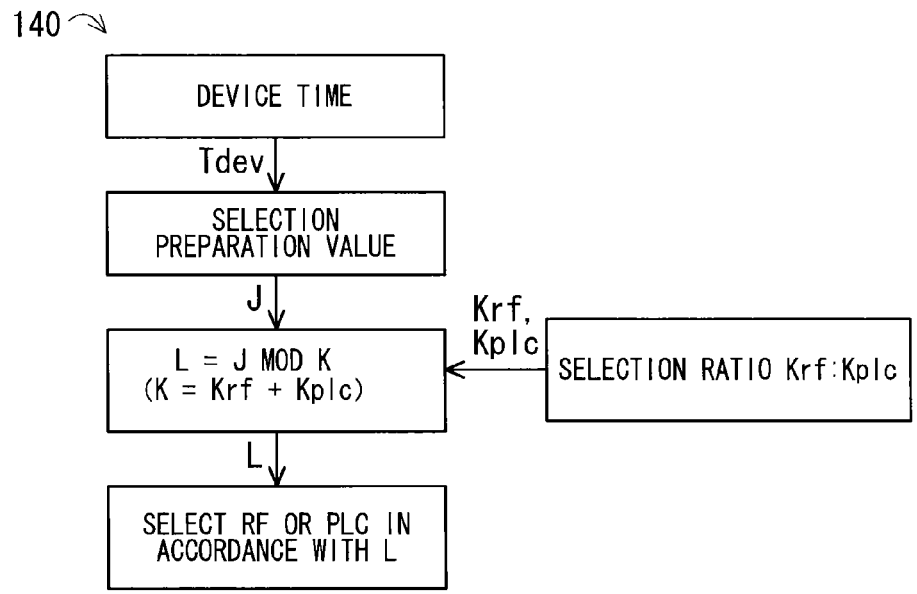
FIG. 7 is a diagram illustrating a selection rule (alternate selection rule) of a communication method according to the first embodiment.

FIG. 7 illustrates a selection rule 140 for selecting a communication method to be allocated to each time slot S. Such a selection rule 140 is a predetermined order selection rule for allocating the RF method and the PLC method to each time slot S in a previously set order. The example of FIG. 7 is an alternate selection rule for alternately allocating especially the RF method and the PLC method illustrated in FIGS. 3 to 5, among the predetermined order selection rules.

In the example of FIG. 7, a selection preparation value J is generated from the device time Tdev, and a remainder L at the time of dividing the obtained selection preparation value J by an index value K (=Krf+Kplc) of a selection ratio (RF:PLC=Krf:Kplc) is obtained, and either the RF method or the PLC method is selected in accordance with the remainder L. Note that, for the sake of simplifying the description, Krf and Kplc are to be positive integers herein.

More specifically, the selection preparation value J, for example, shows what turn of the time slot S the inputted device time Tdev belongs to. In this example, the turn value of the time slot S shown by the selection preparation value J may not be an absolute value counted from the activation time. For example, by using a one-way hash function previously defined regarding acquisition of the selection preparation value J, it is possible to convert the device time Tdev as an input key to the selection preparation value J as a hash value.

As for the selection ratio, for example in the case of alternate selection, Krf:Kplc=1:1, and K=2 is set. With K=2, the remainder L at the time of dividing the selection preparation value J by the selection ratio index value K is 0 or 1. For example, it is previously defined such that the RF method is selected in the case of L=0 and the PLC method is selected in the case of L=1.

For example, by inputting the device time Tdev into the selection rule 140 in each time slot S and allocating the obtained communication method to the next time slot S, it is possible to realize alternate selection of the RF method and the PLC method.

Note that the predetermined order selection rule is not restricted to the alternate selection rule. For example, the selection ratio Krf:Kplc=1:2 may be set (herein, K=3), and it may be defined such that the RF method is selected in the case of the remainder L=0, and the PLC method is selected in the case of the remainder L=1, 2. According to this example, one cycle configured in the order of RF→PLC-→PLC can be repeated.

The device time Tdev at the time of selecting the communication method is involved in (i.e., depends on) such a selection rule 140. For this reason, selection of the communication method can be synchronized between the communication devices 10 with the synchronized device time Tdev. Hence, it is possible to improve deterioration in communication efficiency which occurs due to the communication methods being different between the plurality of communication devices 10.

<Other Examples of System Configuration>

In the above, the case has been illustrated where the device-time synchronization processing 100 is performed by one time synchronization master device 11 and two time synchronization slave devices 12, 13. However, the number of time synchronization master devices and time synchronization slave devices are not restricted thereto.

For example, two communication devices 11, 12 may be operated as the time synchronization master devices, and one communication device 13 may be operated as the time synchronization slave device. As thus described, since the plurality of time synchronization master devices 11, 12 exist, even if the time synchronization master device 11 is removed from the communication system 1, for example, the device-time synchronization processing 100 can be held by another time synchronization master device 12. In other words, it is possible to provide a system that facilitates management of the time synchronization.

In this example, the time synchronization slave device 13 receives the time synchronization request signal 120 from the two time synchronization master devices 11, 12.

In this case, there is considered an example where the time synchronization slave device 13 executes the time synchronization slave processing 102 each time the time synchronization request signal 120 is received, without distinguishing the time synchronization master devices 11, 12.

Alternatively, for example, the time synchronization master devices 11, 12 may set the authority level to the time synchronization request signal 120 and the time synchronization slave device 13 may decide whether or not to execute the time synchronization slave processing 102 based on the authority level. Such an example will be described with reference to a flowchart of FIG. 8.

A different authority level is previously provided to each of the time synchronization master devices 11, 12. Note that such an authority level is, for example, stored into storage means (not shown) of the communication processing unit 50. Then, each of the time synchronization master devices 11, 12 makes the authority level of its own included into the MAC frame 127, the PHY header 125, or the like of the time synchronization request signal 120 (cf. time synchronization master processing 101 of FIG. 8).

Figure 8:
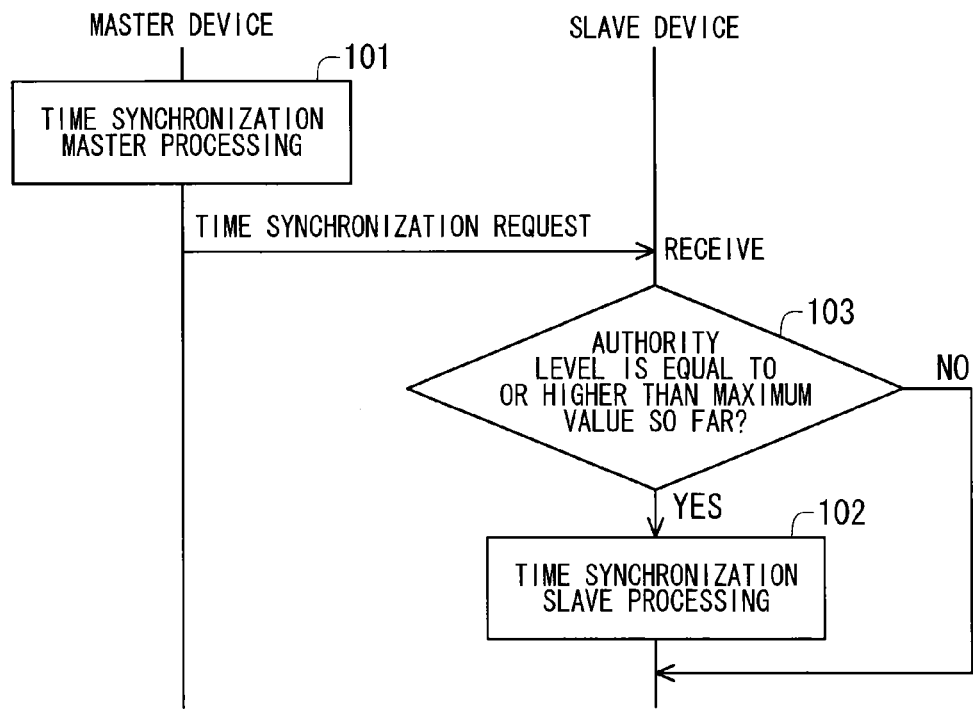
FIG. 8 is a flowchart illustrating device-time synchronization processing that uses an authority level according to the first embodiment.

On the other hand, the time synchronization slave device 13 compares the received authority level of the time synchronization request signal 120 with the maximum value of the authority levels of the time synchronization request signals 120 having been received so far (cf. authority level determination processing 103 of FIG. 8). Note that such a maximum value is, for example, held in storage means (not shown) of the communication processing unit 50, and updated as appropriate.

Then, as shown in FIG. 8, on a condition that the authority level this time is equal to or higher than the above maximum value, the time synchronization slave device 13 executes the time synchronization slave processing 102 in accordance with the time synchronization request signal 120 received this time. As opposed to this, when the authority level this time is lower than the above maximum value, the time synchronization slave processing 102 is not executed with respect to the time synchronization request signal 120 received this time.

The use of the authority level in this manner can suppress frequent execution of the time synchronization slave processing 102 in the time synchronization slave device 13 even in the configuration in which the plurality of time synchronization master devices 11, 12 exist. In view of the fact that frequent execution of the time synchronization slave processing 102 leads to a state where the device time Tdev is not stably set (i.e., uncertain state), it is possible to avoid such an uncertain state.

Here, the time synchronization slave device 13 may perform processing of clearing (i.e., resetting) the above authority level maximum value held by itself. For example, the time synchronization slave device 13 voluntarily executes such holding maximum value clearing processing at predetermined timing. Alternatively, in place of or in addition to the voluntary execution, the holding maximum value clearing processing may be executed by instruction transmitted by another communication device (e.g., either the time synchronization master devices 11 or 12) at predetermined timing. In either example, the above predetermined timing may be cyclical or random.

According to the holding maximum value clearing processing, even if the time synchronization master device 11 with the authority level being the maximum is removed from the communication system 1, the device-time synchronization processing 100 can be held by the remaining time synchronization master device. In other words, it is possible to provide a system that facilitates management of the time synchronization.

Figure 9:
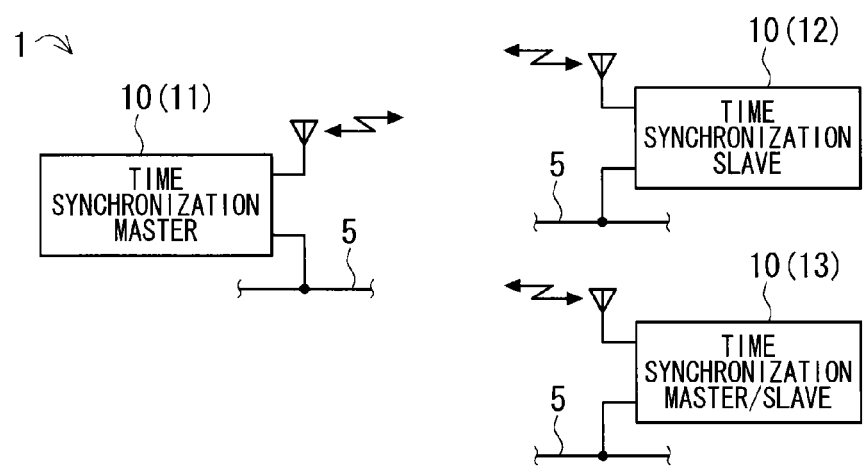
FIG. 9 is a configuration diagram illustrating the communication system according to the first embodiment.

Further, as illustrated in FIG. 9, for example, it is also possible to make the communication device 11 perform time synchronization master processing 101, make the communication device 12 perform the time synchronization slave processing 102, and make the communication device 13 perform both processing 101, 102. Note that hereinafter, the communication device capable of executing both processing 101, 102 may also be referred to as a time synchronization master/slave device.

Figure 10:
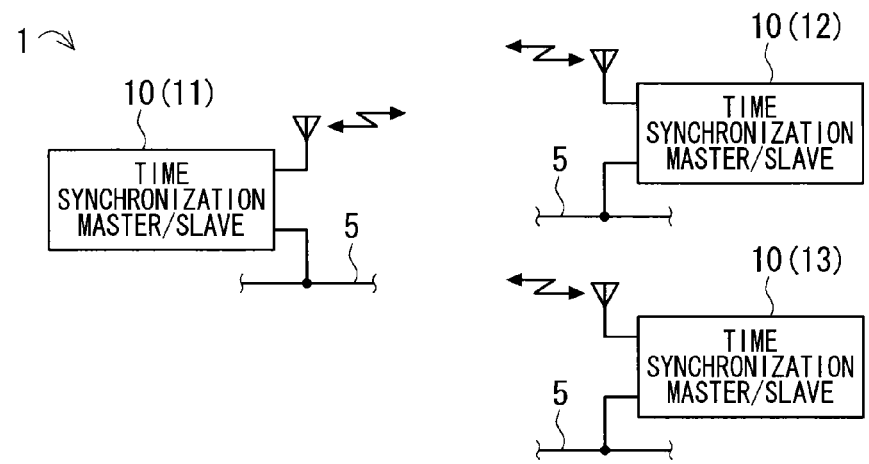
FIG. 10 is a configuration diagram illustrating the communication system according to the first embodiment.

Further, as illustrated in FIG. 10, for example, all the communication devices 11 to 13 can also be configured as the time synchronization master/slave devices.

Due to existence of the plurality of time synchronization master/slave devices 10, it is possible to synchronize the device time Tdev over a broad range of the communication system 1. Such a point helps expansion of installation range for the communication device 10, namely, the area expansion for the communication system 1.

Other Examples According to First Embodiment

The two kinds of communication methods, i.e., the RF method and the PLC method, have been illustrated above. As opposed to this, three or more kinds of communication methods can also be adopted. For example, a wired communication method other than PLC may further be adopted. Moreover, optical communication can also be used. Furthermore, even if a communication medium is the same, it can be used as a separate communication method with respect to each standard. For example, wireless communication based on the standard of IEEE802.11 (where a frequency band with a center frequency of 2.4 GHz is used) and wireless communication based on the standard of IEEE802.15.4g (where a frequency band with a center frequency of 920 MHz is used) can be used as separate communication methods.

Second Embodiment

Figure 11:
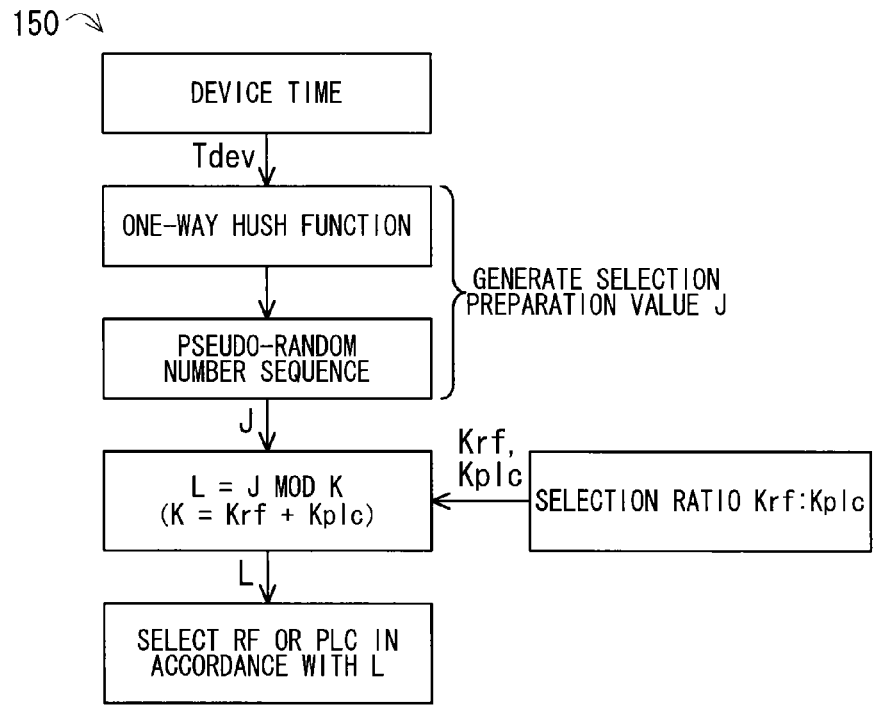
FIG. 11 is a diagram illustrating a selection rule (random selection rule) of a communication system according to a second embodiment.

FIG. 11 illustrates a random selection rule 150 according to a second embodiment in regard to selection of the communication method to be allocated to each time slot S. Such a selection rule 150 is applied to the communication device 10 illustrated in the first embodiment in place of or in addition to the predetermined order selection rule 140 (cf. FIG. 7). Note that, when the plurality of selection rules 140, 150 are provided, the selection rule to be used is decided based on, for example, initial setting, a predetermined condition, an instruction from another communication device 10, or the like.

The example of FIG. 11 is the same as the example of FIG. 7 (predetermined order selection rule 140) except that the selection preparation value J is generated as follows. That is, in the example of FIG. 11, the device time Tdev is inputted as an input key into the one-way hash function previously defined regarding acquisition of the selection preparation value J. Then, with the obtained hash value used as a seed, a pseudorandom number is generated, and the obtained pseudorandom number value is adopted to the selection preparation value J. Accordingly, the communication method to be allocated to each time slot S is selected at random out of a plurality of communication methods (herein, the RF method and the PLC method).

Figure 12:
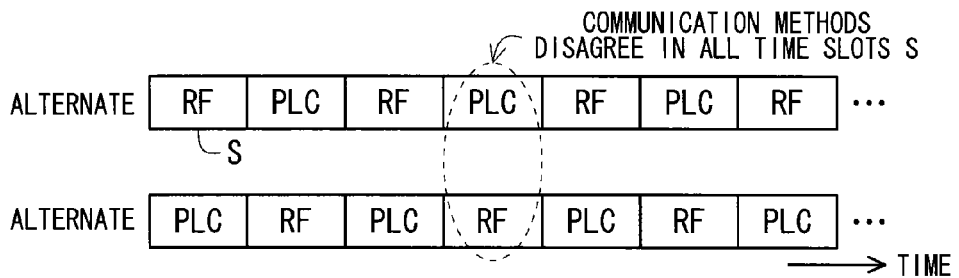
FIG. 12 is a diagram for describing a problem of the alternate selection rule in a state where the device time is not synchronized according to the second embodiment.

Here, when the device time Tdev is not synchronized, the alternate selection rule 140 illustrated in FIG. 7 may cause a state where the communication methods do not agree between the communication devices 10 as shown in FIG. 12. Communication cannot be established in such a state.

Figure 13:
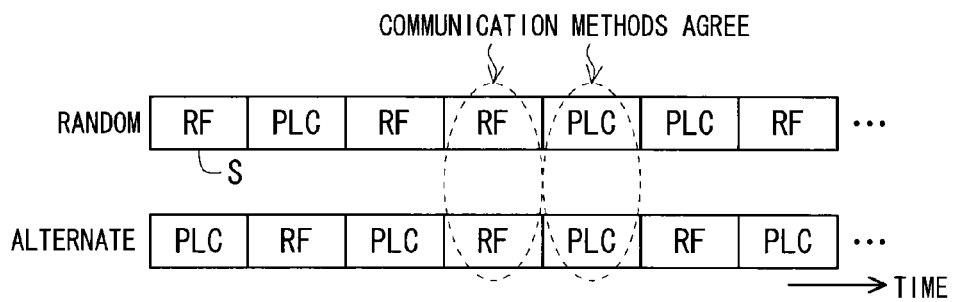
FIG. 13 is a diagram illustrating communication in accordance with the random selection rule according to the second embodiment.

As opposed to this, according to the random selection rule 150, a state where the communication methods agree can be made to appear as illustrated in FIG. 13. Hence, it is possible to avoid a status where an incommunicable state due to disagreement of the communication methods continues.

FIG. 13 illustrates a case where a communication partner has adopted the alternate selection rule 140, but this example is not restrictive. For example, the communication partner may adopt the random selection rule 150.

Figure 14:
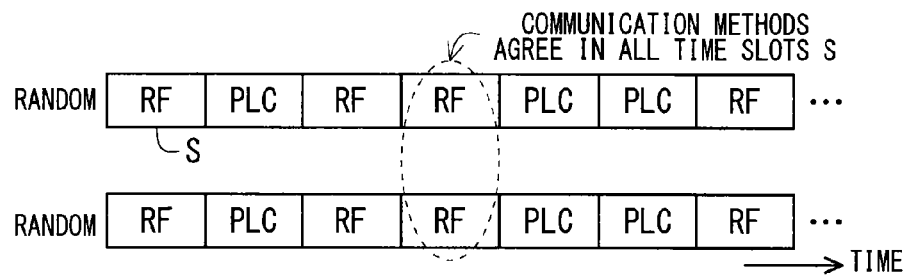
FIG. 14 is a diagram illustrating communication in accordance with the random selection rule according to the second embodiment.

The same pseudorandom number value can be obtained in each communication device 10 especially when the communication partner has adopted the same random selection rule 150 and the device time Tdev is synchronized with each other. This is because the device time Tdev is involved in generation of the pseudorandom number. This results in continuous agreement of the communication method of each time slot S as illustrated in FIG. 14. Hence, it is possible to improve deterioration in communication efficiency which occurs due to the communication methods being different between the communication devices 10.

In the second embodiment, whether or not to perform the device-time synchronization processing 100 according to the first embodiment (cf. FIG. 6) is optional. However, the effect of combination between the device-time synchronization processing 100 and the random selection rule 150 is as described above.

The two kinds of communication methods, i.e., the RF method and the PLC method have been illustrated above. As opposed to this, as mentioned in the first embodiment, three or more kinds of communication methods can also be adopted.

Third Embodiment

Figure 15:
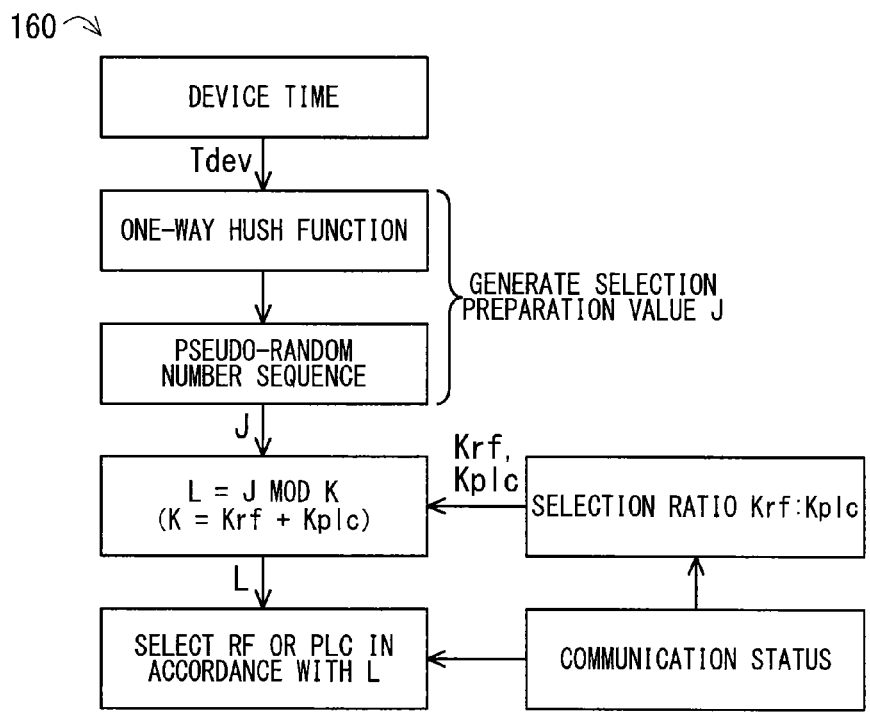
FIG. 15 is a diagram illustrating a selection rule (adaptive selection rule) of a communication system according to a third embodiment.

FIG. 15 illustrates an adaptive selection rule 160 according to a third embodiment in regard to selection of the communication method to be allocated to each time slot S. Such a selection rule 160 is applied to the communication device 10 illustrated in the first embodiment in place of the selection rules 140, 150 (cf. FIG. 7 and FIG. 11), or in addition to at least one of the selection rules 140, 150. When two or three of the selection rules 140, 150, 160 are provided, the selection rule to be used is decided based on, for example, initial setting, a predetermined condition, an instruction from another communication device 10, or the like.

The adaptive selection rule 160 is a rule in which a communication method whose communication status is better between a plurality of communication methods (herein, the RF method and the PLC method) is selected with a higher selection ratio.

The adaptive selection rule 160 illustrated in FIG. 15 is obtained by applying information of a communication status to the random selection rule 150 illustrated in FIG. 11. Therefore, according to such an example, the adaptive selection rule 160 is broadly divided into a first rule (corresponding to the random selection rule 150) in which a pseudorandom number value is generated based on the device time Tdev and a communication method associated with the pseudorandom number value is selected, and a second rule in which the above association between the pseudorandom number value and the communication method is changed in accordance with a communication status.

More specifically describing the second rule, in order that a communication method whose communication status is better between the RF method and the PLC method is selected with a higher selection ratio, a selection ratio index value Krf:Kplc is changed in accordance with the communication statuses of RF and PLC while the association between the remainder L and the communication method is also changed in accordance with the above communication statuses.

Figure 16:
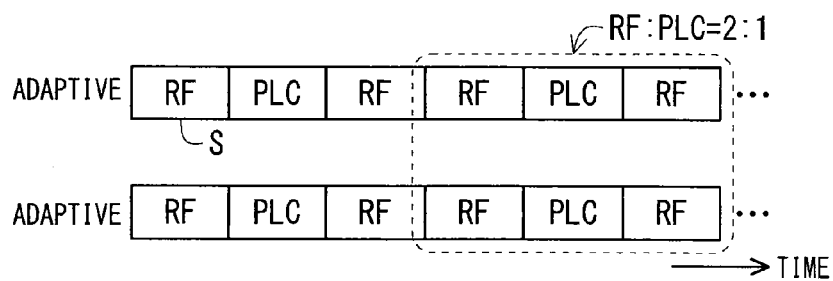
FIG. 16 is a diagram illustrating communication in accordance with the adaptive selection rule according to the third embodiment.

FIG. 16 illustrates a case where the communication method is allocated with a selection ratio of Krf:Kplc=2:1 (Here, K=3) based on an investigation result indicating that the communication status of the RF method is better than that of the PLC method.

The investigation result of the communication status is expressed, for example, by any of three levels of evaluation: RF is better; RF and PLC are on the same degree; and PLC is better. Alternatively, the evaluation indicating that RF is better and the evaluation indicating that PLC is better may be further divided in accordance with the degree thereof. Note that the degree of the communication status can be acquired, for example, from a calculation formula: {value expressing the communication status of RF}/{value expressing the communication status of PLC}.

Further, for example, on each evaluation level of the communication status, the selection ratio Krf:Kplc is previously prepared while the association between the remainder L and the communication method is previously prepared. According to this, the selection ratio Krf:Kplc and the above association are selected in accordance with the evaluation level, and the communication method is allocated to each time slot S in accordance with the selected condition.

Here, the communication status can be investigated by evaluating a useful parameter for grasping the communication status. Examples of the above parameter include a result of a carrier sense, an ACK response ratio, the number of times of retransmission, and the like. The communication status of each of RF and PLC is acquired by evaluating one or a plurality of parameters described above by means of a previously set method with respect to each communication status. Then, the communication status of RF and the communication method of PLC are compared, to thereby allow discrimination of a favorable communication method, decision of an evaluation level, and the like. Note that the investigation of the communication status may be performed cyclically, or may be performed at random time intervals.

Although collection, evaluation, and the like of the above parameters are to be performed by the selection means 54 itself which uses the adaptive selection rule 160, for example, the MAC processing means 53 may perform those processing and provide results of the processing to the selection means 54. In either example, the communication status is investigated by the communication processing unit 50.

According to the adaptive selection rule 160, since a favorable communication method is selected as appropriate in accordance with the communication status, it is possible to improve the efficiency, reliability, and the like of communication.

Further, since the adaptive selection rule 160 illustrated in FIG. 15 uses the random selection rule 150, it is possible to obtain the above effect exerted by the random selection rule 150.

Note that the use of the selection rule other than the random selection rule 150 is also possible. For example, a plurality of patterns of predetermined order selection rules are previously prepared, and one of those is used in accordance with the communication status.

Here, the communication status may be investigated by each communication device 10 in the communication system 1.

Figure 17:
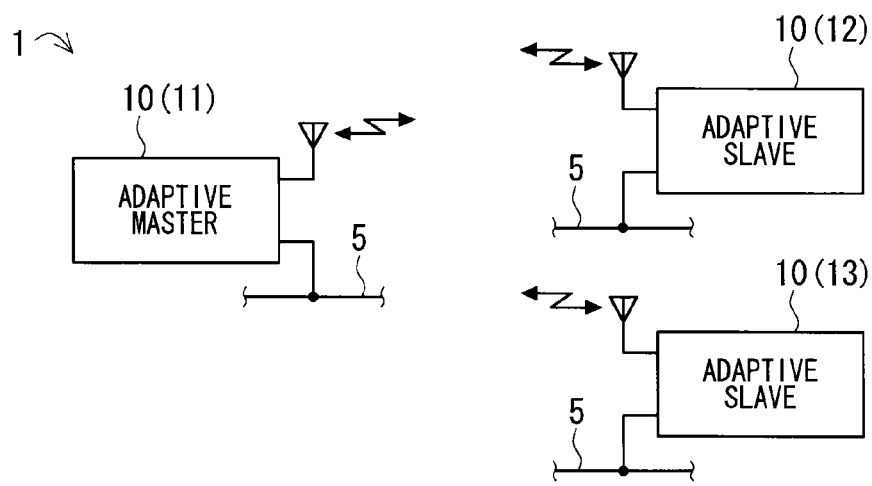
FIG. 17 is a configuration diagram illustrating a communication system according to the third embodiment.

Alternatively, for example, the communication device 11 may investigate the communication status, and distribute a result of the investigation to the other communication devices 12, 13 by broadcasting. In this case, the communication device 11 acquires the communication status by investigating the communication status by itself, whereas the communication devices 12, 13 each acquire the communication status by receiving the investigation result from the communication device 11. In such an example, the communication device 11 may be referred to as a first communication device 11 regarding the adaptive selection rule or an adaptive master device 11, and the communication devices 12, 13 may be referred to as second communication devices 12, 13 regarding the adaptive selection rule or adaptive slave devices 12, 13 (cf. FIG. 17).

Since the adaptive slave devices 12, 13 themselves do not need to investigate the communication status, it is possible to reduce processing loads, device configurations, and the like.

Note that the investigation result of the communication status may be directly received from the adaptive master device 11, or may be received through the relay by another adaptive slave device.

Figure 18:
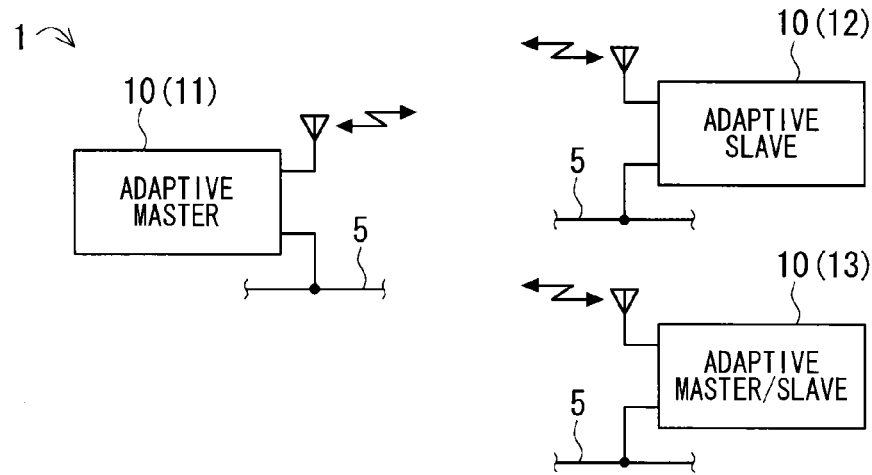
FIG. 18 is a configuration diagram illustrating the communication system according to the third embodiment.

Further, a plurality of adaptive master devices 10 may exist. Moreover, the communication device 10 (hereinafter, may also be referred to as adaptive master/slave device) capable of performing operation as the adaptive master device while being capable of performing operation as the adaptive slave device. FIG. 18 illustrates a case where the communication device 13 is the adaptive master/slave device.

In the third embodiment, whether or not to perform the device-time synchronization processing 100 according to the first embodiment (cf. FIG. 6) is optional. However, in view of the fact that the adaptive selection rule 160 uses the random selection rule 150, the combination between the device-time synchronization processing 100 and the adaptive selection rule 160 is useful.

The two kinds of communication methods, i.e., the RF method and the PLC method have been illustrated above. As opposed to this, as mentioned in the first and second embodiments, three or more kinds of communication methods can also be adopted.

Fourth Embodiment

In the first to third embodiments, the synchronous communication by a so-called continuous driving method (also referred to as continuous operation method or the like) has been described. In a fourth embodiment, asynchronous communication by a so-called intermittent driving method (also referred to as intermittent operation method or the like) will be described.

Comparative Example

Prior to description of a specific example according to the fourth embodiment, a general intermittent driving communication (also referred to as intermittent communication) as a comparative example will be described with reference to FIG. 19. Especially, FIG. 19 relates to a communication device to conform to only the RF method.

Figure 19:
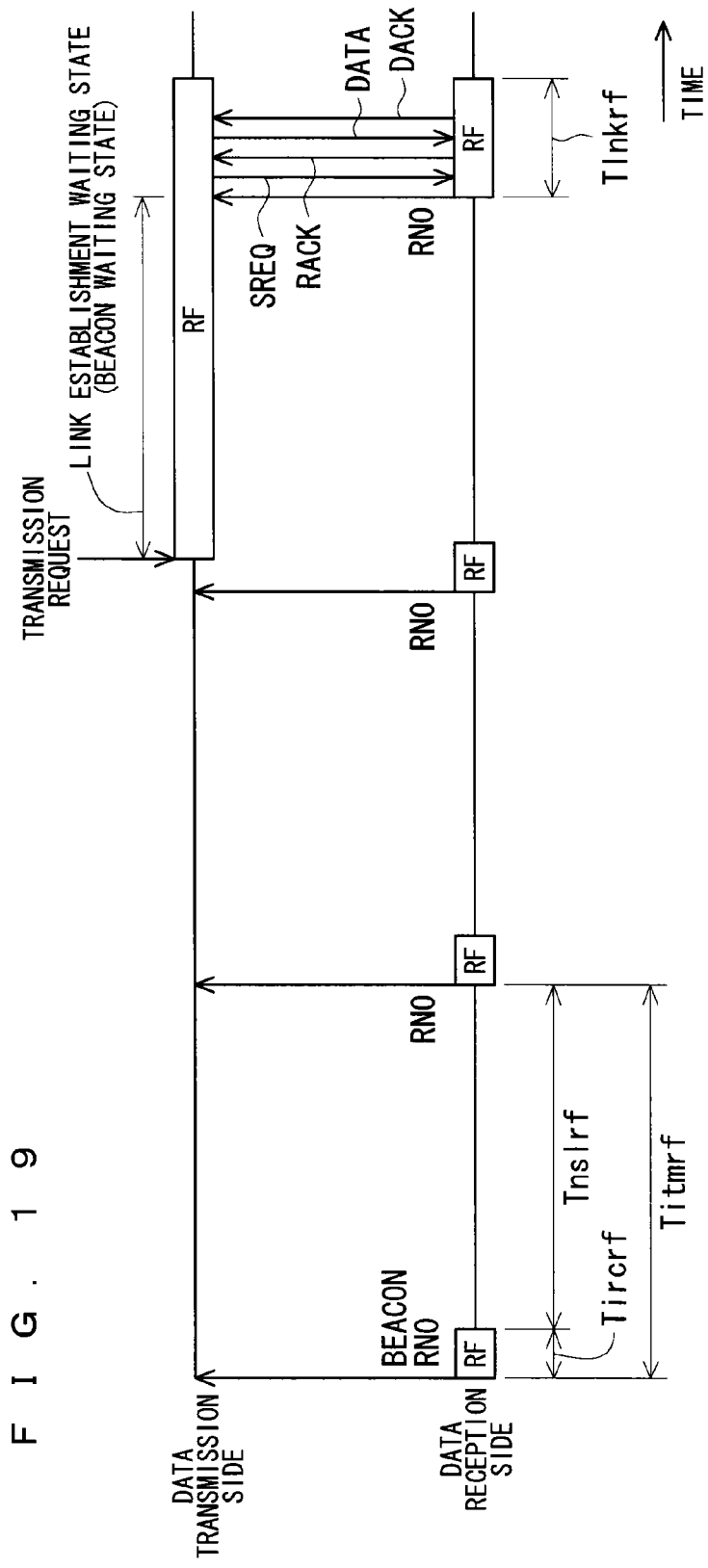
FIG. 19 is a sequence diagram for describing general intermittent communication as a comparative example of a fourth embodiment.

As shown in FIG. 19, a communication device on the data (DATA) receiving side intermittently activates the communication function in a predetermined intermittent cycle Titmrf, and transmits (i.e., issues) a beacon RN0. The beacon RN0 is a beacon for notifying that the reception-side device has started a communicable state. Hereinafter, a beacon for such a use may be referred to as a reception-side beacon or the like. Here, the reception-side beacon RN0 is to be broadcasted.

After transmission of the beacon RN0, the reception-side device waits for a response to the beacon RN0 during a predetermined beacon response waiting time Tircrf. Note that the above symbol Tircrf is also used with respect to the beacon response waiting period in order to avoid complicating the symbol. Further, the same usage may be adopted to another symbol.

The reception-side device stops the communication function with completion of the response waiting period Tircrf if a response to the beacon RN0 (herein, a transmission request SREQ is illustrated) is not received from a communication device on the data (DATA) transmitting side during the response waiting time Tircrf. Then, after the lapse of a communication stopped period Tnslrf, the reception-side device transmits the beacon RN0 again. In this case, Titmrf=Tircrf+Tnslrf holds.

As opposed to this, when the transmission request SREQ is received during the beacon response waiting period Tircrf, the data reception-side device transmits a response RACK to SREQ to the data transmission-side device, to thereby seek establishment of a communication link. After establishment of the communication link, the reception-side device receives DATA from the transmission-side device, and with completion of the reception, the reception-side device transmits the response DACK to the transmission-side device. After the lapse of the link holding period Tlnkrf, the data reception-side device stops the communication function.

On the other hand, upon generation of the transmission request, the data transmission-side device activates the communication function, to form a beacon RN0 reception waiting state. Then, when receiving the beacon RN0 issued in the communication device to be a destination, the transmission-side device transmits the transmission request SREQ to the reception-side device. The transmission-side device receives the response RACK to SREQ, to thereby seek establishment of the communication link. After establishment of the communication link, transmission of DATA is started, and DACK is received, to complete transmission. After completion of the transmission, the transmission-side device stops the communication function. Note that when the beacon RN0 cannot be received during predetermined maximum beacon waiting time (i.e., maximum link establishment waiting time), a transmission error (i.e., timeout) occurs.

In such intermittent communication, the communication link is formed as necessary, and the transmission side and the reception side do not need to be kept synchronized.

Example According to Fourth Embodiment

Figure 20:
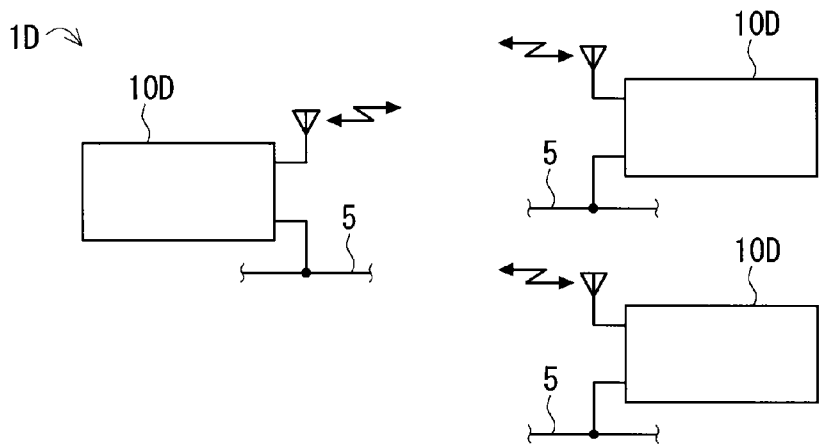
FIG. 20 is a configuration diagram illustrating a communication system according to a fourth embodiment.

FIG. 20 illustrates a schematic configuration of a communication system 1D according to the fourth embodiment. In the example of FIG. 20, the communication system 1D includes three communication devices 10D. However, the number of communication devices 10D is not restricted to this example.

Figure 21:
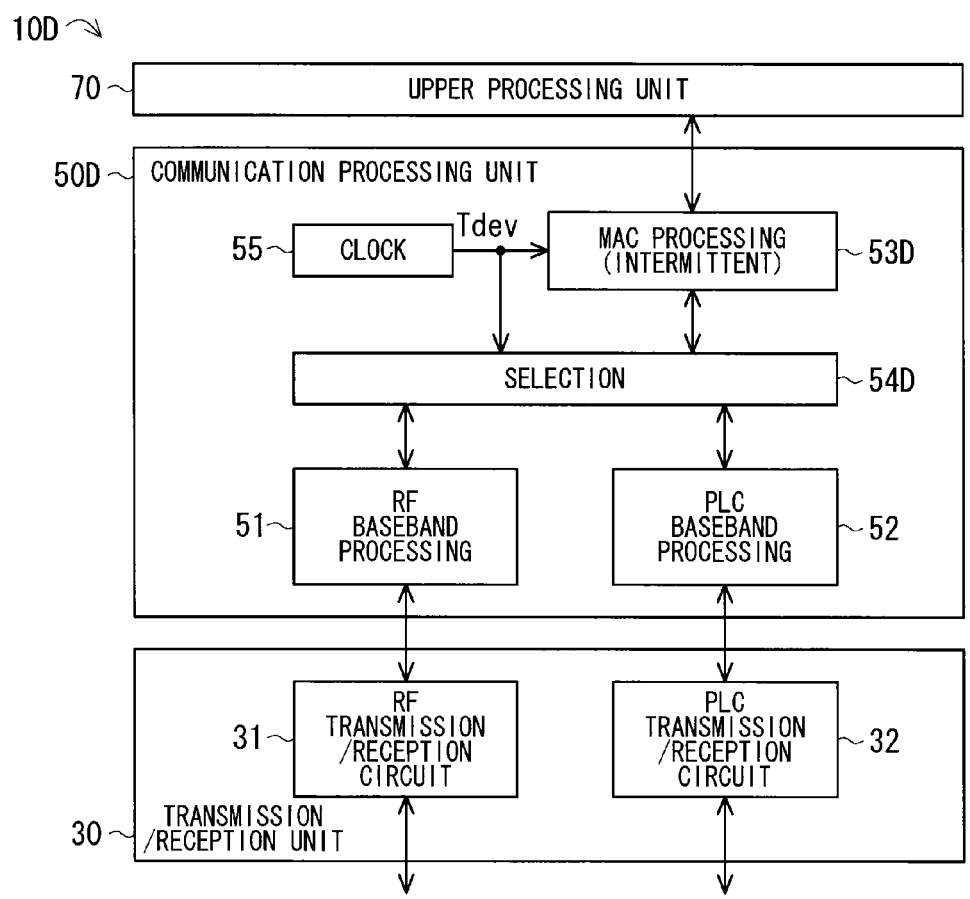
FIG. 21 is a block diagram illustrating a communication device according to the fourth embodiment.
Figure 22:
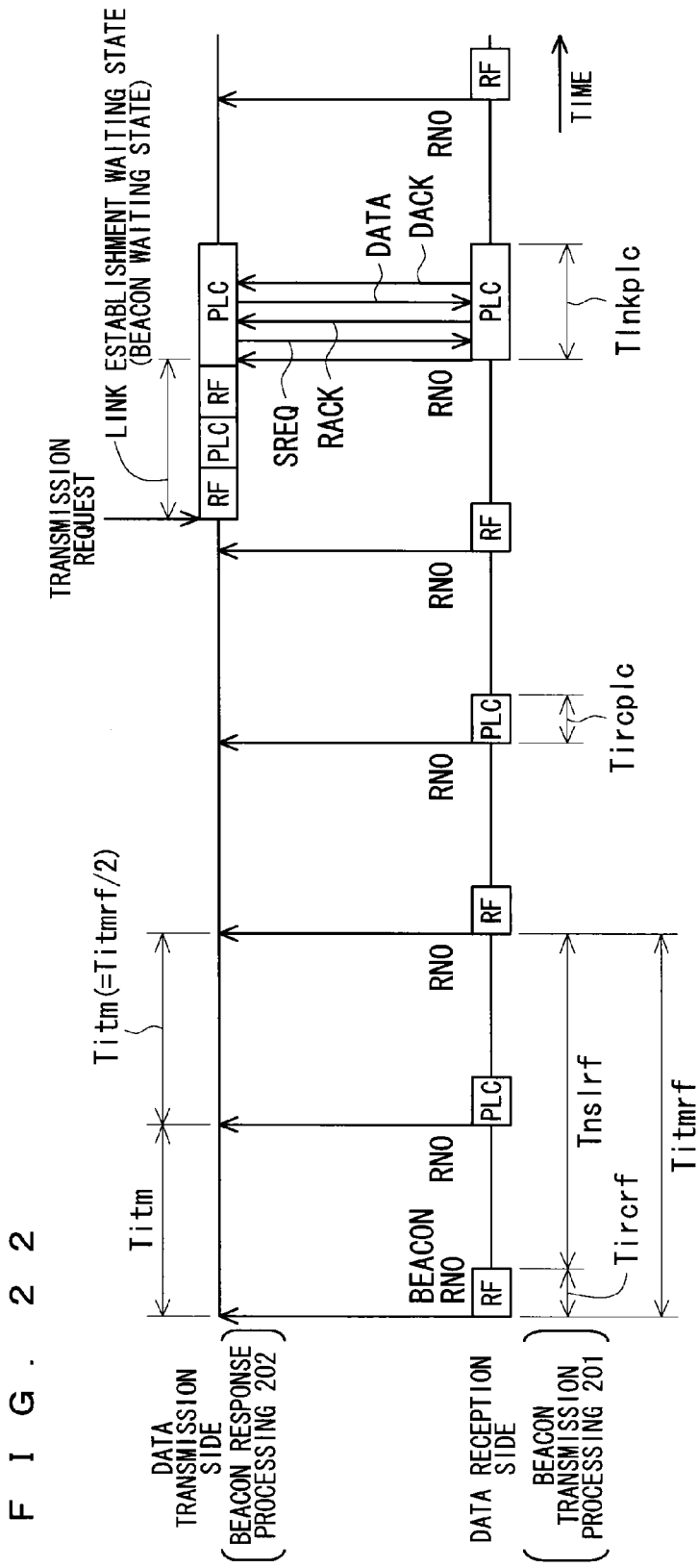
FIG. 22 is a sequence diagram illustrating a communication operation according to the fourth embodiment.

FIG. 21 illustrates a block diagram of the communication device 10D, and FIG. 22 illustrates a communication operation of the communication device 10D. According to the example of FIG. 21, the communication device 10D has a configuration in which the communication processing unit 50 has been changed to a communication processing unit 50D in the communication device 10 illustrated in FIG. 2. Further, the communication processing unit 50D has a configuration in which the MAC processing means 53 and the selection means 54 have been changed to MAC processing means 53D and selection means 54D, respectively, in the communication processing unit 50 illustrated in FIG. 2. Other configurations of the communication device 10D are to be basically the same as those of the communication device 10.

Note that in FIG. 21, a description regarding synchronization processing on the device time Tdev (cf. FIG. 2) is omitted.

The communication processing unit 50D basically performs the same processing as that of the communication processing unit 50, but performs processing in accordance with intermittent communication. For example, the communication processing unit 50D performs at least one of beacon transmission processing 201 (cf. FIG. 22) and beacon response processing 202 (cf. FIG. 22).

Here, the communication device 10D that performs the beacon transmission processing 201 may be referred to as a first communication device regarding the use of a beacon, and the communication device 10D that performs the beacon response processing 202 may be referred to as a second communication device regarding the use of a beacon. Hereinafter, following the example of FIG. 19, an example will be cited where the first communication device 10D is a data reception-side device and the second communication device 10D is a data transmission-side device.

In the case of a configuration to perform both the beacon transmission processing 201 and the beacon response processing 202, both processing 201, 202 are switched as appropriate. For example, the beacon transmission processing 201 is normally performed, and it is switched to the beacon response processing 202 when a transmission request is made from the upper processing unit 70 (i.e., when a packet to be transmitted is generated). In this case, one communication device 10D is operable as the data reception side device, and also operable as the data transmission side device.

<Beacon Transmission Processing 201>

The beacon transmission processing 201 is processing of intermittently transmitting the reception-side beacon RN0. Especially, in the beacon transmission processing 201, either the RF method or the PLC method is selected in accordance with a predetermined selection rule, and the reception-side beacon RN0 is transmitted by the selected communication method. Here, the reception-side beacon RN0 is to be broadcasted.

In the example of FIG. 22, the alternate selection rule for alternately selecting the RF method and the PLC method has been adopted, and the beacon RN0 is transmitted once by the PLC method during an RF-method stopped period (i.e., unselected period) Tnslrf.

In order to facilitate understanding of the description, FIG. 22 illustrates in regard to the RF method, the beacon transmission intermittent cycle Titmrf, the beacon response waiting time Tircrf, and the unselected time Tnslrf with the same time lengths as in the comparative example of FIG. 19. Further, a case is described herein where the beacon RN0 by the PLC method is transmitted at timing of a half cycle of the RF-method intermittent cycle Titmrf. In this case, the beacon RN0 by the RF method and the beacon RN0 by the PLC method are transmitted alternately in the same intermittent cycle Titm (=Titmrf/2). Further, a case is illustrated where the beacon response waiting time Tircplc with respect to the PLC-method beacon RN0 has the same time length as the beacon response waiting time Tircrf with respect to the RF-method beacon RN0. However, set values for various times are not restricted to the above illustration.

Note that PLC-method link holding time Tlnkplc may have the same time length as the RF-method link holding time Tlnkrf (cf. FIG. 19), or may have a different time length from the link holding time Tlnkrf in accordance with a difference in communication speed or the like. Further, the time lengths of these link holding times Tlnkplc, Tlnkrf may be predetermined fixed values or variable values in accordance with a size of received DATA.

The reception-side beacon RN0 is generated in the following manner. For example, by a timer (not shown) for counting the unselected time Tnslrf and the like, the end of the unselected time Tnslrf is notified to the communication processing unit 50D. Then, with the notification from the timer, the MAC processing means 53D generates a MAC frame for the beacon RN0 (hereinafter, also referred to as beacon frame). The generated beacon frame is transmitted as the RF-method beacon RN0 or the PLC-method beacon RN0 in accordance with the communication method selected by the selection means 54D.

In the example of FIG. 22, the selection means 54D selects the communication method to be used for transmission of the beacon RN0 in accordance with the alternate selection rule for alternately selecting the RF method and the PLC method.

Note that the beacon response waiting time Tircrf, Tircplc, the link holding period Tlnkrf, Tlnkplc, and the like are to be counted by the device time Tdev provided by the clock 55, but for example, the above timer may also be used.

<Beacon Response Processing 202>

The beacon response processing 202 is processing of attempting reception of the reception-side beacon RN0, and making response the beacon RN0. Especially, in the beacon response processing 202, the RF method and the PLC method are switched to attempt reception of the beacon RN0, and a response is made (herein, the transmission request SREQ is transmitted) to the beacon RN0 by the communication method by which the beacon RN0 has been received. The beacon response processing 202 is started in accordance with the transmission request from the upper processing unit 70, for example.

In the beacon response processing 202, switching of the RF method and the PLC method is performed, for example, by the selection means 54D in accordance with the alternate selection rule which is used in the beacon transmission processing 201. Further, in the example of FIG. 22, switching of the RF method and the PLC method is performed in shorter time than the transmission cycle Titm of the beacon RN0. However, switching of the communication method in the beacon response processing 202 is not restricted to these examples.

Note that, the communication method switching cycle Titm, the maximum beacon waiting time, and the like are to be counted by the device time Tdev provided by the clock 55, but for example, the above timer may also be used.

As in the comparative example of FIG. 19, transmission/reception of RACK, transmission/reception of DATA, and transmission/reception of DACK are to be performed after the beacon response processing 202.

Effect According to Fourth Embodiment

In the intermittent communication, the data transmission side has to wait for data transmission until the beacon RN0 is received, namely, until the communication link is established. Such a waiting state causes a communication delay. Considering a case where the state becomes the beacon reception waiting state immediately after transmission of the beacon RN0, the delay time can be the same length as the RF-method intermittent cycle Titmrf at the maximum.

As for such a communication delay, according to the communication system 1D, the beacon RN0 is transmitted by the PLC method even during the RF-method unselected period, and hence the transmission interval of the beacon RN0 can be made shorter. According to the example of FIG. 22, the transmission interval of the beacon RN0 is half as that in the example of FIG. 19. Further, the beacon RN0 reception side waits for arrival of the beacon RN0 by switching the RF method and the PLC method, and hence it can correspond when the beacon RN0 is transmitted by either communication method.

Therefore, according to the communication system 1D, as compared with the above comparative example without the PLC method, it is possible to reduce the beacon RN0 reception waiting (i.e., communication link establishment waiting) time, and it is possible to improve the communication delay that is caused by such waiting time. Further, it is thereby possible to improve the efficiency, reliability, and the like of communication.

Figure 23:
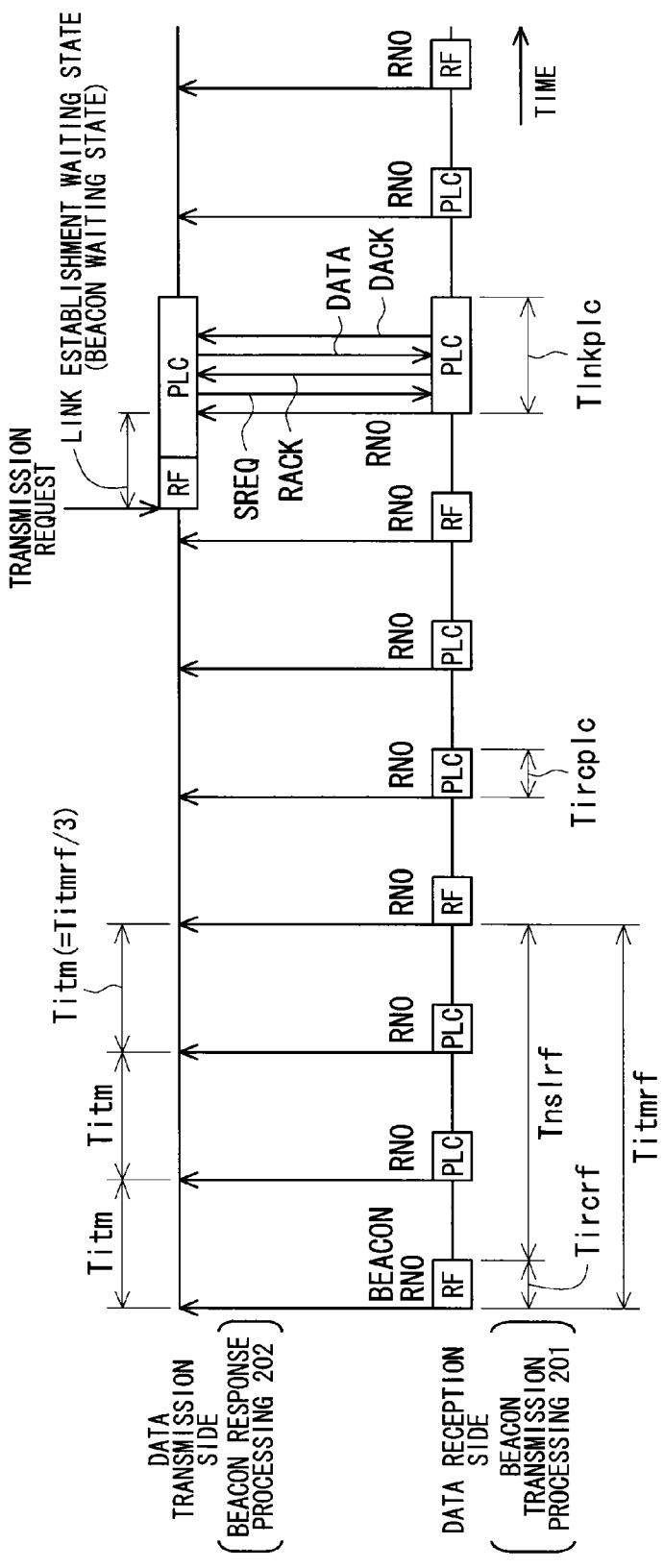
FIG. 23 is a sequence diagram illustrating the communication operation according to the fourth embodiment.

Here, as illustrated in FIG. 23, the beacon RN0 may be transmitted twice by the PLC method during the RF-method unselected period Tnslrf. This example can be realized by selecting the communication method in accordance with a predetermined order selection rule that defines a predetermined order of RF→PLC→PLC as one cycle. Further, beacon transmission by the PLC method can be performed three times or more.

According to the these examples, it is possible to further shorten a transmission interval Titm of the beacon RN0, and it is thereby possible to further improve the link establishment waiting time and the communication delay that occurs due to this. Further, it is possible to obtain such an effect without increasing the number of kinds of communication methods.

Meanwhile, a configuration can, for example, be considered in which both the RF-method transmission/reception circuit 31 and the PLC-method transmission/reception circuit 32 are driven by supplied power (hereinafter, referred to as externally supplied power) of the power line 5 (cf. FIG. 20) being used for PLC.

Further, a configuration can, for example, be considered in which the RF transmission/reception circuit 31 is driven by a battery (not shown) and the PLC transmission/reception circuit 32 is driven by supplied power (externally supplied power) of the power line 5 (cf. FIG. 20) being used for PLC. According to this example, even if the number of times of transmission of the beacon RN0 increases, the service life of the above battery can be prolonged.

Further, according to the configuration in which the RF transmission/reception circuit 31 is drivable by the battery (may further be drivable by the externally supplied power), for example, there can be considered an example where only the RF transmission/reception circuit 31 is driven by the battery in a place having no power source line or a place difficult to provide the power source line.

Moreover, according to the configuration in which the RF transmission/reception circuit 31 is drivable by both the battery and the externally supplied power, for example, there can be considered an example where the supplied power of the power line 5 is usually used, and it is switched to the battery when the supplied power of the power line 5 runs out due to a power cut or the like. According to this example, the RF communication can be ensured.

Note that, also to the form of power supply to the communication processing unit 50D and the like, any of the battery, the externally supplied power, and the combination of those can be adopted.

Since two kinds of communication methods, i.e., the RF method and the PLC method are illustrated herein, only the RF method is to be used in the same manner as the above comparative example in an environment or a status where power from the power line 5 cannot be acquired (thus, the PLC method cannot be used). Even in such a case, the communication processing unit 50D is to perform both the processing for the RF method and the processing for the PLC method as described above. Alternatively, in addition to the operation mode that performs both the processing for the RF method and the processing for the PLC method, an operation mode that performs only the processing for the RF method may also be installed in advance into the communication processing unit 50D, and the two kinds of operation modes may be switched.

Note that the above variety of examples regarding the form of power supply of the communication device are also applicable to other embodiments.

Other Examples According to Fourth Embodiment

In the above example, the beacon RN0 is temporally transmitted at regular intervals by the RF method and the PLC method. As opposed to this, the beacon RN0 can also be transmitted at irregular intervals. Moreover, differently from the above example, the beacon RN0 by the RF method can also be transmitted at irregular intervals.

Further, in the above, the two kinds of communication methods, i.e., the RF method and the PLC method have been illustrated above. As opposed to this, as mentioned in the first to third embodiments, three or more kinds of communication methods can also be adopted. In view of such a point, the above variety of examples can be generalized as follows regarding the communication device configured communicably by the first to N-th (N is an integer of 2 or more) communication methods.

For example, the beacon transmission processing 201 is processing of intermittently transmitting the beacon RN0 by the first communication method, while intermittently transmitting the beacon RN0 by the second to N-th communication methods during the unselected period of the first communication method.

Here, in the beacon transmission processing 201, the beacon RN0 may be transmitted by using at least one kind of communication method out of the second to N-th communication methods twice or more during the unselected period of the first communication method.

Further, the beacon response processing 202 is processing of switching the first to N-th communication methods to attempt reception of the beacon RN0, and response is made to the beacon RN0 by the communication method by which the beacon RN0 has been received.

In other words, the example has been illustrated where N=2, the first communication method is the RF method, and the second communication method is the PLC method, but this example is not restrictive.

In the intermittent communication, there is a period in which all the communication methods are in the unselected state, and in such a period, the communication processing unit 50D and the transmission/reception unit 30 may be in a so-called sleep state. While the power supply can be continued to hold the operation state, adoption of the sleep state allows reduction in power consumption.

Here, whether or not to bring the clock 55 into the sleep state is optional. That is, the clock 55 may be configured to come into the sleep state along with the MAC processing means 53D and the like, or the clock 55 may be configured to keep operating while the MAC processing means 53D and the like come into the sleep state. In the former case, the device time Tdev is reset each time the sleep state occurs, and is thus not held. As opposed to this, in the latter case, the device time Tdev can be held. Note that, for example, the clock 55 can be kept operated by providing a power source for the clock 55 separately from the power source for the MAC processing means 53D or the like.

In the fourth embodiment, even in the case where the device time Tdev is held, whether or not to perform the device-time synchronization processing 100 according to the first embodiment (cf. FIG. 6) is optional.

In the above example, the communication method is selected in accordance with the predetermined order selection rule (including the alternate selection rule). As opposed to this, it is also possible to apply the random selection rule 150 (cf. FIG. 11), the adaptive selection rule (cf. FIG. 15), and the like to selection of the communication method. According to the random selection rule 150 and the adaptive selection rule, the beacon RN0 by the first communication method (the RF method is illustrated above) may be transmitted at irregular intervals.

Here, the selection rules 140, 150, 160 illustrated in the first to third embodiments depend on the device time Tdev. For this reason, those selection rules 140, 150, 160 are applicable to a configuration in which the device time Tdev is held. As opposed to this, in a configuration in which the device time Tdev is not held, for example, a predetermined set value may be used in place of the device time Tdev.

Further, in the above example, the beacon transmission processing 201 and the beacon response processing 202 use the same selection rule. As opposed to this, the processing 201, 202 may use different selection rules.

Further, the case has been illustrated above where the communication system 1D includes only the communication device 10D to conform to a plurality of communication methods. However, the communication system 1D can include a communication device that performs intermittent communication by one communication method.

Fifth Embodiment

Figure 24:
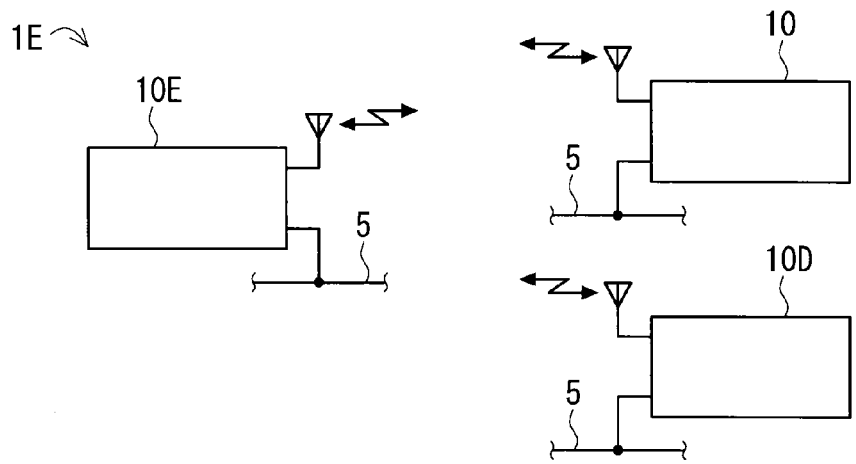
FIG. 24 is a configuration diagram illustrating a communication system according to a fifth embodiment.

FIG. 24 illustrates a schematic configuration of a communication system 1E according to a fifth embodiment. The communication system 1E in the example of FIG. 24 includes a communication device 10E according to the fifth embodiment while including the communication device 10 according to any of the first to third embodiments and the communication device 10D according to the fourth embodiment. That is, in the communication system 1E, the communication device 10 that performs synchronous communication and the communication device 10D that performs asynchronous communication are mixed, and in view of this, the communication device 10E is configured such that it can correspond to both the synchronous communication and the asynchronous communication. However, the number of communication devices 10, 10D, 10E is not restricted to the example of FIG. 24.

Figure 25:
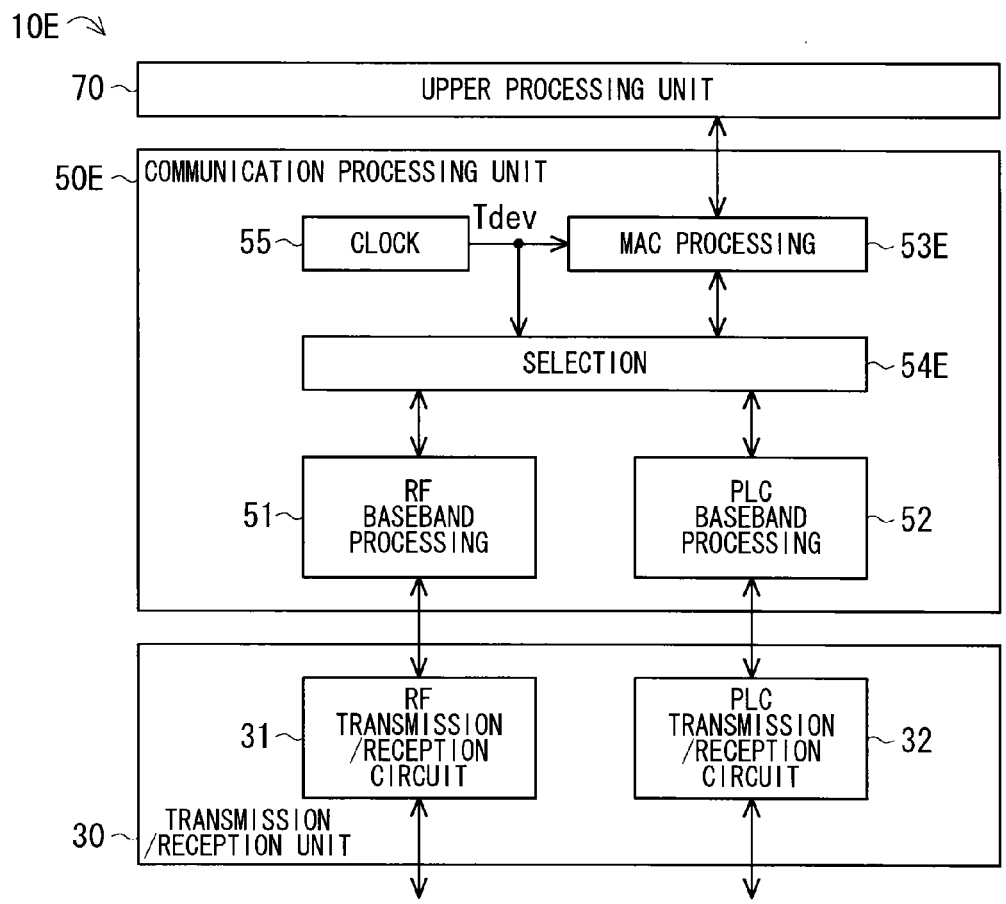
FIG. 25 is a block diagram illustrating a communication device according to the fifth embodiment.

FIG. 25 illustrates a block diagram of the communication device 10E. According to the example of FIG. 25, the communication device 10E has a configuration in which the communication processing unit 50 has been changed to a communication processing unit 50E in the communication device 10 illustrated in FIG. 2. Further, the communication processing unit 50E has a configuration in which the MAC processing means 53 and the selection means 54 have been changed to MAC processing means 53E and selection means 54E in the communication processing unit 50 illustrated in FIG. 2. Other configurations of the communication device 10E are to be basically the same as those of the communication device 10.

Substantially, the MAC processing means 53E has both the function of the MAC processing means 53 (cf. FIG. 2) and the function of the MAC processing means 53D (cf. FIG. 21), and provides a variety of functions as appropriate.

For this reason, for example, as shown in FIG. 26, the MAC processing means 53E can be configured by provision of both the MAC processing means 53, 53D and cooperation of both processing 53, 53D. However, this example is not restrictive. For example, an overlapping function may be omitted from the MAC processing means 53D.

Substantially, the selection means 54E has both the selection means 54 (cf. FIG. 2) and the selection means 54D (cf. FIG. 21), and provides a variety of functions as appropriate.

Here, the device time Tdev is to be held in the communication device 10E. Hence, it is possible to perform the synchronization processing 100 for the device time Tdev (cf. FIG. 6). However, it is also possible to adopt a configuration in which the device-time synchronization processing 100 is not performed. In either case, the description regarding the device-time synchronization processing (cf. FIG. 2) is omitted in FIG. 25.

As shown in FIG. 27, in the communication device 10E, synchronous communication processing 301 and asynchronous communication processing 302 are performed in parallel by synchronous/asynchronous parallel processing 300. Specifically, the time slot S for synchronous communication is controlled by the synchronous communication processing 301, and transmission of the beacon RN0 for asynchronous communication is controlled by the asynchronous communication processing 302.

Especially, in the asynchronous communication processing 302, the beacon RN0 is intermittently transmitted by the communication method being selected in the synchronous communication processing 301. Further, according to the example of FIG. 27, the beacon RN0 is transmitted in synchronization with start timing for the time slot S. In the example of FIG. 27, the transmission period for the beacon RN0 has been set to three times as long as the time length of the time slot S, but this example is not restrictive. For example, the beacon RN0 may be transmitted in each time of the time slot S.

More specifically, the selection means 54E functions in the same manner as the selection means 54, so that the time slots S allocated with either communication method are sequentially generated. Note that, although the alternate selection rule is illustrated in FIG. 27, this example is not restrictive.

Further, the MAC processing means 53E functions in the same manner as the MAC processing means 53, so that the synchronous communication can be performed in each time slot S. Moreover, the MAC processing means 53E generates the beacon frame in the same manner as the MAC processing means 53D, so that the beacon RN0 is transmitted by the communication method which is allocated to the time slot S at that time.

Specifically, the MAC processing means 53E acquires switch timing for the time slot S from the selection means 54E and outputs the beacon frame in accordance with the switch timing, so that the beacon RN0 can be transmitted in synchronization with the start timing for the time slot S. Alternatively, for example, transmission timing for the beacon RN0 may be adjusted by the selection means 54E holding the input of the beacon frame into the baseband processing means 51 or 52 until the next start timing for the time slot S.

In the synchronous/asynchronous parallel processing 300, the communication link holding periods Tlnkrf, Tlnkplc (cf. FIG. 19 and FIG. 22) of the asynchronous communication are set equal to or less than the time length of the time slot S. Accordingly, the asynchronous communication can be completed within each time slot S and the reliability of the asynchronous communication can be ensured. Further, transmitting the beacon RN0 at the start timing for the time slot S as described above allows the communication link holding times Tlnkrf, Tlnkplc to be taken long.

Here, for example, when the upper processing unit 70 instructs transmission by the asynchronous communication, control of the time slot S may be suspended and the above beacon response processing 202 (cf. FIG. 22) may be performed.

According to the communication device 10E, it is communicable with the communication device 10 by the synchronous communication processing 301, and also communicable with the communication device 10D by the asynchronous communication processing 302. That is, according to the communication device 10E, in the communication system using a plurality of communication methods in a time-division manner, the synchronous communication using the time slot S and the asynchronous communication using the beacon RN0 can be mixed.

In the fourth embodiment, the communication device 10D that performs the beacon transmission processing 201 is referred to as the first communication device regarding the use of a beacon, and the communication device 10D that performs the beacon response processing 202 is referred to as the second communication device regarding the use of a beacon. Following this, the communication device 10E is included in the first communication device. Moreover, in view of the point that the synchronous communication processing 301 is further performed, the communication device 10E may be referred to as a third communication device regarding the use of a beacon.

Other Examples According to Fifth Embodiment

The two kinds of communication methods, i.e., the RF method and the PLC method have been illustrated above. As opposed to this, as mentioned in the first to fourth embodiments, three or more kinds of communication methods can also be adopted.

Further, the case has been illustrated above where the communication system 1E includes only the communication systems 10, 10D to conform to a plurality of communication methods. However, the communication system 1E can include a communication device that performs intermittent communication by one communication method.

The variety of examples in the first to fourth embodiments are applicable to the communication device 10E and the communication system 1E.

Application Examples

The variety of communication systems and communication devices illustrated above are applicable not only to basic uses such as telephone conversations and data communications, but also to other uses.

For example, combining the communication device with a sensor to configure a sensor device allows construction of an information gathering system for gathering information detected in each sensor device. More specifically, adopting a camera or a motion sensor as the above sensor allows construction of a security monitoring system. Further, adopting a measuring instrument for consumption amounts of electricity, gas, water, and the like as the above sensor allows construction of a so-called telemeter system.

Moreover, for example, installing a control function for an object to be controlled (e.g., lighting device) in the commu- Additional Remark Although the present invention has been described in detail, the above descriptions are illustrative in every aspect and do not restrict the present invention. It is understood that countless numbers of modified examples, not shown, can be conceived without deviating from the scope of the present invention.

DESCRIPTION OF REFERENCE SIGNS 1, 1D, 1E communication system
5 power line
10, 11 to 13, 10D, 10E communication device
30 transmission/reception unit
31 RF transmission/reception circuit
32 PLC transmission/reception circuit
50, 50D, 50E communication processing unit
51 RF baseband processing means
52 PLC baseband processing means
53, 53D, 53E MAC processing means
54, 54D, 54E selection means
55 clock
70 upper processing unit
100 device-time synchronization processing
101 time synchronization master processing
102 time synchronization slave processing
103 authority level determination processing
120 time synchronization request signal
121 synchronization control part
122 signal main part
128 time stamp
140 predetermined order selection rule
150 random selection rule
160 adaptive selection rule
201 beacon transmission processing
202 beacon response processing
300 synchronous/asynchronous parallel processing
301 synchronous communication processing
302 asynchronous communication processing
RN0 beacon
S time slot
Tdev device time
Titm beacon transmission period
Tnslrf RF-method unselected period (unselected time)

The invention claimed is:

1. A communication system comprising:
a plurality of communication devices, wherein
each of said plurality of communication devices includes:
   transmission/reception circuitry configured to conform to a plurality of communication methods; and
   communication processing circuitry configured to
      select one of said plurality of communication methods with respect to each time slot in accordance with a predetermined selection rule, and
      perform communication via said transmission/reception circuitry by the selected communication method,
said plurality of communication devices includes:
   at least one first communication device configured to perform time synchronization master processing that includes
      transmitting a time synchronization request signal, said time synchronization request signal including a synchronization control part and a signal main part subsequent to said synchronization control part, and said signal main part including a time stamp,
      after said synchronization control part of said time synchronization request signal starts to be transmitted, determining a first device time value of the at least one first communication device that corresponds to a time point when said signal main part of said time synchronization request signal starts to be transmitted, and
      before the time stamp in said signal main part of said time synchronization request signal is transmitted, including said first device time value as the time stamp into said signal main part of said time synchronization request signal, and
   at least one second communication device configured to perform time synchronization slave processing that includes
      receiving said time synchronization request signal,
      after said synchronization control part of said time synchronization request signal starts to be received, determining a second device time value of the at least one second communication device that corresponds to a time point when said signal main part of said time synchronization request signal starts to be received, and
      calibrating said second device time value of the at least one second communication device based on said time stamp in said time synchronization request signal,
said at least one first communication device includes a plurality of first communication devices,
said time synchronization master processing includes processing of setting an authority level to said time synchronization request signal, and
said time synchronization slave processing is executed on a condition that said authority level of said received time synchronization request signal is the same as a maximum value of said authority levels of said time synchronization request signals having received so far or higher than said maximum value.

2. The communication system according to claim 1, wherein
said predetermined selection rule is a rule involving a device time when the communication method is selected.

3. The communication system according to claim 1, wherein
said at least one first communication device includes at least one communication device capable of executing said time synchronization slave processing in addition to said time synchronization master processing.

4. The communication system according to claim 1, wherein
said at least one second communication device includes at least one communication device capable of executing said time synchronization master processing in addition to said time synchronization slave processing.

5. A communication device, comprising:
transmission/reception circuitry configured to conform to a plurality of communication methods; and
communication processing circuitry configured to
   select one of said plurality of communication methods with respect to each time slot in accordance with a predetermined selection rule, and perform communication via said transmission/reception circuitry by the selected communication method,
wherein
said communication processing circuitry is configured to perform time synchronization master processing that includes
transmitting a time synchronization request signal, said time synchronization request signal including a synchronization control part and a signal main part subsequent to said synchronization control part, and said signal main part including a time stamp,
after said synchronization control part of said time synchronization request signal starts to be transmitted, determining a first device time value of the communication device that corresponds to a time point when said signal main part of said time synchronization request signal starts to be transmitted, and
before the time stamp in said signal main part of said time synchronization request signal is transmitted, including said first device time value as the time stamp into said signal main part of said time synchronization request signal,
said communication processing circuitry is further configured to perform time synchronization slave processing that includes
receiving another time synchronization request signal, said another time synchronization request signal including a synchronization control part and a signal main part subsequent to said synchronization control part, and said signal main part including a time stamp,
after said synchronization control part of said another time synchronization request signal starts to be received, determining a second device time value of the communication device that corresponds to a time point when said signal main part of said another time synchronization request signal starts to be received, and
calibrating the second device time value of the communication device based on the time stamp in said another time synchronization request signal,
said time synchronization master processing includes processing of setting an authority level to said time synchronization request signal, and
said time synchronization slave processing is executed on a condition that said authority level of said received time synchronization request signal is the same as a maximum value of authority levels of time synchronization request signals having received so far or higher than said maximum value.

6. The communication device according to claim 5, wherein
said communication processing circuitry is configured to suspend the transmission until a start of a next time slot when a transmission cannot be completed during a time slot at a time of reception of a transmission instruction.

7. A communication device, comprising:
transmission/reception circuitry configured to conform to a plurality of communication methods; and
communication processing circuitry configured to
select one of said plurality of communication methods with respect to each time slot in accordance with a predetermined selection rule, and
perform communication via said transmission/reception circuitry by the selected communication method, wherein
said communication processing circuitry is configured to perform time synchronization slave processing that includes
receiving a time synchronization request signal from another communication device, said time synchronization request signal including a synchronization control part and a signal main part subsequent to said synchronization control part, and said signal main part including a time stamp, wherein the time stamp includes a first device time value of the another communication device that corresponds to a time point when said signal main part of said time synchronization request signal starts to be transmitted by the another communication device,
after said synchronization control part of said time synchronization request signal starts to be received, determining a second device time value of the communication device that corresponds to a time point when said signal main part of said time synchronization request signal starts to be received, and
calibrating said second device time value of the communication device based on said time stamp in said time synchronization request signal, said time synchronization request signal includes an authority level, and
said time synchronization slave processing is executed on a condition that said authority level of said received time synchronization request signal is the same as a maximum value of authority levels of time synchronization request signals having received so far or higher than said maximum value.

* * * * *